(12) United States Patent
Best et al.

(10) Patent No.: US 11,867,510 B2
(45) Date of Patent: Jan. 9, 2024

(54) INTEGRATED VISION-BASED AND INERTIAL SENSOR SYSTEMS FOR USE IN VEHICLE NAVIGATION

(71) Applicant: Trimble Inc., Sunnyvale, CA (US)

(72) Inventors: Gregory C. Best, San Francisco, CA (US); Peter Van Wyck Loomis, Sunnyvale, CA (US)

(73) Assignee: Trimble Inc., Sunnyvale, CA (US)

( * ) Notice: Subject to any disclaimer, the term of this patent is extended or adjusted under 35 U.S.C. 154(b) by 625 days.

(21) Appl. No.: 17/074,108

(22) Filed: Oct. 19, 2020

(65) Prior Publication Data

US 2021/0033401 A1 Feb. 4, 2021

Related U.S. Application Data

(62) Division of application No. 15/919,842, filed on Mar. 13, 2018, now Pat. No. 10,845,198.
(Continued)

(51) Int. Cl.
*G06T 3/00* (2006.01)
*G06V 10/24* (2022.01)
(Continued)

(52) U.S. Cl.
CPC ......... *G01C 21/1656* (2020.08); *G01C 21/28* (2013.01); *G01C 23/00* (2013.01);
(Continued)

(58) Field of Classification Search
None
See application file for complete search history.

(56) References Cited

U.S. PATENT DOCUMENTS 8,494,225 B2 7/2013 Center
8,577,539 B1 11/2013 Morrison et al.
(Continued)

FOREIGN PATENT DOCUMENTS

WO 20140072377 A1 5/2014

OTHER PUBLICATIONS

Li et al., "Real-time motion tracking on a cellphone using inertial sensing and a rolling-shutter camera", IEEE International Conference on Robotics and Automation, May 2013, pp. 4712-4719. (Year: 2013).*
(Continued)

*Primary Examiner* — Todd Melton
(74) *Attorney, Agent, or Firm* — Kilpatrick Townsend & Stockton LLP

(57) ABSTRACT

A navigation system useful for providing speed and heading and other navigational data to a drive system of a moving body, e.g., a vehicle body or a mobile robot, to navigate through a space. The navigation system integrates an inertial navigation system, e.g., a unit or system based on an inertial measurement unit (IMU). with a vision-based navigation system unit or system such that the inertial navigation system can provide real time navigation data and the vision-based navigation can provide periodic, but more accurate, navigation data that is used to correct the inertial navigation system's output. The navigation system was designed with the goal in mind of providing low effort integration of inertial and video data. The methods and devices used in the new navigation system address problems associated with high accuracy dead reckoning systems (such as a typical vision-based navigation system) and enhance performance with low cost IMUs.

19 Claims, 18 Drawing Sheets

Related U.S. Application Data

(60) Provisional application No. 62/471,200, filed on Mar. 14, 2017.

(51) Int. Cl.
  *G01C 21/16* (2006.01)
  *G05D 1/02* (2020.01)
  *G01C 23/00* (2006.01)
  *G06T 7/246* (2017.01)
  *G06T 7/73* (2017.01)
  *G01C 21/28* (2006.01)
  *G06T 7/70* (2017.01)

(52) U.S. Cl.
  CPC ......... *G05D 1/0223* (2013.01); *G05D 1/0246* (2013.01); *G06T 3/0093* (2013.01); *G06T 7/246* (2017.01); *G06T 7/248* (2017.01); *G06T 7/73* (2017.01); *G06V 10/247* (2022.01); *G05D 2201/0213* (2013.01); *G06T 7/70* (2017.01); *G06T 2207/10016* (2013.01); *G06T 2207/10024* (2013.01); *G06T 2207/30241* (2013.01); *G06T 2207/30244* (2013.01); *G06T 2207/30248* (2013.01); *G06T 2207/30252* (2013.01)

(56) References Cited

U.S. PATENT DOCUMENTS

| | | |
|---|---|---|
| 9,031,782 B1 | 5/2015 | Lemay et al. |
| 9,842,254 B1 | 12/2017 | Brailovskiy et al. |
| 9,911,395 B1 | 3/2018 | Townsend et al. |
| 10,043,076 B1 | 8/2018 | Zhang et al. |
| 10,404,926 B2 * | 9/2019 | Douady-Pleven .... G06T 3/0093 |
| 2011/0218733 A1 | 9/2011 | Hamza et al. |
| 2014/0300732 A1 | 10/2014 | Friend et al. |
| 2015/0293138 A1 | 10/2015 | Briod et al. |
| 2016/0144505 A1 | 5/2016 | Fong et al. |
| 2018/0150718 A1 | 5/2018 | Omari et al. |
| 2018/0225540 A1 | 8/2018 | Ell |

OTHER PUBLICATIONS

Partial International Search Report for PCT Application No. PCT/US2018/022214, dated Jun. 7, 2018.

Mourikis and Roumeliotis, A Multi-State Constraint Kalman Filter for Vision-aided Inertial Navigation, IEEE 2007 (Year: 2007).

* cited by examiner

INTEGRATED VISION-BASED AND INERTIAL SENSOR SYSTEMS FOR USE IN VEHICLE NAVIGATION

CROSS-REFERENCE TO RELATED APPLICATIONS

This application is a divisional of U.S. patent application Ser. No. 15/919,842, filed Mar. 13, 2018, which claims the benefit of U.S. Provisional Application No. 62/471,200, filed Mar. 14, 2017, which are both incorporated herein by reference in their entirety.

BACKGROUND

1. Field of the Invention

The present description generally relates to vision-based navigation (or positioning) systems for use in moving bodies such as automobiles and other vehicles, mobile robots, handheld devices, and the like. More particularly, the present description is directed toward a navigation system for a moving body (such as a vehicle) that combines outputs of a computer vision-based navigation system (or also called a video navigation system) to effectively estimate a current speed (or velocity) and/or heading of a vehicle or other moving body.

2. Relevant Background

It is becoming increasingly common for vehicles to include vision-based positioning or navigation systems that are used to facilitate driverless or automated navigation of the vehicle and to provide assistance to a human pilot or driver of the vehicle. For example, a vision-based navigation system may be provided on an automobile (or other vehicle such as an unmanned aerial vehicle (UAV) or the like), and it may include one or more cameras that are used to capture image frames that are processed to provide estimates of the vehicle's current speed and heading as well as the vehicle's current position. The outputs of the vision-based navigation system can be provided to the driver to assist in navigation or provided to a driver system to allow an automated vehicle to navigate through traffic and/or to avoid obstacles as it moves toward a defined destination.

For vision-based navigation systems to be more widely adopted in vehicles, there are a number of operational challenges that need to be addressed. Computer vision-based positioning system are capable of measuring three translational dimensions as well as three rotational dimensions that allow it to provide useful navigation information including a vehicle's position, speed, and heading. However, one limitation of vision-based positioning systems is the computational effort required to calculate results including the vehicle's current speed. Even with desktop-type hardware, it can be difficult or impossible to run a vision-based positioning system in close to real time, which is demanded or at least desired for navigation of a vehicle.

Another problem associated with vision-based navigation systems is information loss. Rolling shutter and global shutter are the two fundamental architectures for image sensors (or cameras) used for image capture in a vision-based navigation system. A global shutter sensor exposes an entire frame at once and then records it or reads it out. A rolling shutter sensor staggers the start and stop times for the exposure on a row-by-row basis along the sensor, which results in an image where each row is captured at a slightly different time. A benefit of the rolling shutter is that it requires less semiconductor area to implement and is, thus, less expensive than the global shutter architecture.

However, a challenge with use of rolling shutter sensors is that the image data lacks spatial coherence across rows when there is motion in either the scene or the camera (or both are moving). For example, a rolling shutter sensor that is stationary may be used to capture an image of a rolling train (or other vehicle). Since each row is captured at a different time and the train is in a different location for each row, the captured image gives the appearance that the train is sheared (leaning away from the direction of travel rather than being vertical). In another example, a moving camera may be used to capture an image of the surrounding space that may include a city's skyline. In this case, the camera is in a different place as each row is captured such that skyline will appear slanted. In yet another example, a relatively stationary camera may be used to capture images of a spinning airplane propeller. In this case, the rotational speed of the propeller is fast enough relative to the row-by-row capture rate that the propeller blades in the captured image show significant distortion, and, in some instances, the distortion is so great that the blades appear disconnected from the hub. As a result, the impact on computer vision-based navigation algorithms of rolling shutter information loss can be devastating. Specifically, for vision-based estimations in motion, the algorithms need to understand the geometric relationships between different parts of the image, and this information can be destroyed when the perspective changes between rows.

Hence, there remains a need for improvements to vision-based navigation systems to address the associated problems including how to provide navigational data, such as the current speed, heading, location, and the like, for a moving body such as an automobile on an ongoing or near real-time basis. Preferably, the new vision-based navigation systems will be practical for the many existing and planned uses of vision-based navigation systems and will have a relatively low implementation cost (e.g., rather than providing an implementation that is optimized for maximum performance but is impractical and/or very expensive).

SUMMARY

Briefly, the inventors designed a navigation system for providing speed and heading and other navigational data useful by a drive system of a moving body (e.g., a body of a vehicle, a mobile robot, a handheld device, or the like) to navigate through a space. The navigation system integrates an inertial navigation system (e.g., a unit or system based on an inertial measurement unit (IMU)) with a vision-based navigation system (or video navigation (VN) unit or system) such that the inertial navigation system can provide real time navigation data and the vision-based navigation can provide periodic—but more accurate—navigation data that is used to correct the inertial navigation system's output.

The navigation system was designed with the goal in mind of providing low effort integration of inertial and video data. The methods and devices used in the new navigation system address problems associated with high accuracy dead reckoning systems (such as a typical VN unit/system) and provide better performance from low cost IMUs. The inventors recognized, with regard to problems with present navigation techniques, inertial and video navigation would benefit from aiding by the other, but the complexities of video processing make measurement very processor intensive. Inertial navigation units drift cubic or quadratic with time.

Video navigation can give drift characteristics that are linear with distance traveled, but real-time video navigation on low-cost processors is not currently practical.

The navigation systems described herein use new techniques and devices that were designed with the recognition that video navigation (VN) works by measuring differences between two frame pairs. The calculations can take many multiples of real time (e.g., a predefined time period considered to provide "real-time" output) to complete. One unique idea presented by the inventors involves taking a quick frame pair at typical video rates (e.g., 1/30 second between frames in pair) and begin processing with a VN unit or system. While the VN system is processing the frame pair, the inertial navigation unit or system (e.g., a module with one or more IMUS) propagates its navigation data or measurements (e.g., estimated speed and heading of a moving body such as a vehicle or its body). Over the course of this processing interval, acceleration measurement errors for the inertial navigation unit will start accumulating. At the end of the processing interval, the VN system returns an accurate measurement of camera displacement and rotation between those two frames of the captured frame pair (i.e., its navigation data or output over a fixed time period giving velocity and angular rate measurements). The VN system's measurements are then used by the navigation system to retroactively discipline the inertial navigation unit (or its IMU(s)), and another frame pair is captured by the VN system for processing during the next processing period with the inertial navigation unit working from the accurate data from the VN system until this next processing period ends.

More particularly, a system is described for use in navigating a vehicle or other moving body (e.g., a UAV, a mobile robot, a handheld device, or the like). The system includes an imaging unit, on a moving body, providing a first source of heading and speed estimates for the moving body based on positions of features identified in images obtained at different times. Also, on the moving body, the system includes an inertial navigation unit providing a second source of heading and speed estimates for the moving body based on at least one of gyroscopic measurements and accelerometer measurements. Further, the system includes a filter combining the heading and speed estimates from the first and second sources to provide an overall system heading and speed estimate for the moving body. In operation, the filter uses the heading and speed estimates from the imaging unit to bound drifts in the heading and speed estimates provided by the inertial navigation unit.

In some embodiments of the system, the filter sends the heading and speed estimates provided by the inertial navigation unit to the imaging unit to increase a speed of calculating the heading and speed estimates based on the positions of the features identified in images obtained at different times. The navigation system may be configured such that the imaging unit provides the heading and speed estimates based on the positions of features identified in images obtained at regular time intervals. In the same or other implementations of the system, the imaging unit provides the heading and speed estimates based on the positions of features identified in images obtained at time intervals determined by the filter based on performance of the inertial navigation unit. In some cases, the imaging unit provides the heading and speed estimates based on the positions of features identified in images obtained at regular intervals of distance travelled. Additionally, it may be useful for the imaging unit to be configured to provide the heading and speed estimates at a frequency based on computing constraints.

In another exemplary embodiment, a navigation system is provided for vehicles and other moving bodies, and the navigation system is positioned or mounted on a navigable body with a drive system. During operations, the navigation system generates navigation data for use by the drive system to move the navigable body through a space. The navigation system includes an inertial navigation unit including an inertial measurement unit (IMU) and an IMU dead reckoning module processing a set of measurements provided by the IMU to generate a first output including a first velocity of the navigable body. The navigation system further includes a vision-based navigation system including an image sensor sequentially capturing a pair of images of the space and further including a vision-based dead reckoning module processing the pair of images to generate a second output including a second velocity of the navigable body. Additionally, the navigation system includes a processor executing code or software to provide an integration module that processes the first and second outputs to generate the navigation data. The navigation data includes the first velocity or a first position calculated based on the first velocity during a time period while the vision-based navigation system is generating the second output at the end of which the first velocity is modified based on the second velocity.

In some embodiments of the navigation system, the navigation data further comprises a heading of the navigable body in the space. In these embodiments, the heading may be provided in the first output of the IMU, and the vision-based dead reckoning module processes the pair of images based on the heading to process portions of the pair of images with information predicted to be lost with further travel of the navigable body or to predict portions of later frames with new information.

In the same or other embodiments, after the first velocity is modified based on the second velocity, the IMU dead reckoning module processes an additional set of measurements provided by the IMU to generate a third output including a third velocity of the navigable body. The integration module can then process the third output to generate the navigation data based on the third output and the modified first velocity.

In some specific implementations, the time period (in which the output from the IMU is relied upon) is in the range of 6 to 10 times a frame rate of the image sensor. It may be useful for the image sensor to include at least two video cameras that are directed or aimed at an angular offset of 180 degrees. The image sensor may take the form of a rolling shutter image sensor, and the vision-based navigation system may further include a rolling shutter compensation module processing the pair of images based on a speed of the navigable body to reverse distortion caused by a rolling shutter effect. In most cases, the image sensor is configured such that the pair of images include a region of overlap.

DETAILED DESCRIPTION

The present description provides improved devices and methods for use in navigation systems such as those provided in automobiles and other vehicles. More specifically, new navigation systems are taught that integrate inertial positioning devices and methods (e.g., positioning data provided by an inertial measurement unit (IMU)) with the more accurate computing intensive computer vision-based positioning systems and methods to provide navigation data in near real time to a vehicle's drive system.

Figure 1:
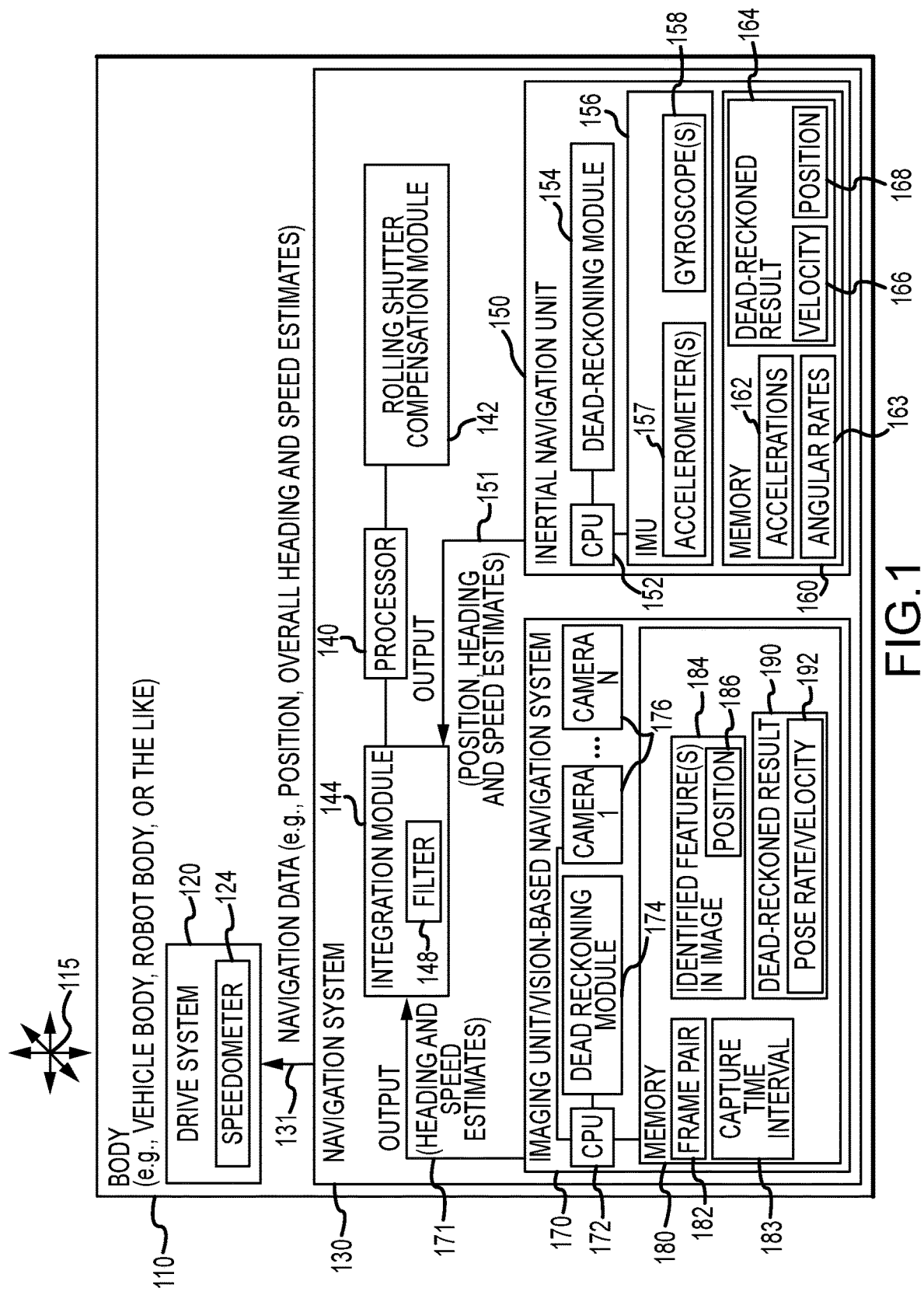
FIG. 1 is a functional block diagram of a moving body (such as a vehicle body, a mobile robot, or handheld device moving through a space) with a navigation system of the present description.

FIG. 1 illustrates schematically a body 110 that is moving as shown with arrows 115 through a space. The body 110 may be nearly any moving body such as a vehicle body, a body of a mobile robot, a handheld device, and the like. The body 110 includes a drive system 120 operating to move 115 the body 110 based on a set of navigation data 131 (e.g., current position in the space, overall heading and speed/velocity estimates, and the like), and a speedometer 124 may be included to measure the speed of the body 110 and to provide its measurements to a rolling shutter compensation module 142 (as explained below).

A navigation system 130, which may be included on the moving (or movable) body 110 or offboard with wireless communications to the components on the body, generates the navigation data 131 in near real time to facilitate accurate navigation and/or control of the drive system 120. The navigation system 130 includes a processor 140 that executes code or runs software to provide functionality of an integration module 144 with a filter (or filtering mechanism) 148 that processes and combines output (e.g., position, heading and speed estimates, and the like) 151 from an inertial navigation unit 150 and output (e.g., heading and speed estimates and the like) 171 from an imaging unit (or vision-based positioning/navigation system) 170. The processor 140 may also execute code or run software to provide functionality of a rolling shutter compensation module 142 that may be used to process images 182 (or other images captured by cameras 176) to correct distortion. The various processors of the system are shown separately for the sake of clarity of description, but it is understood that their functionality may be combined or redistributed among actual hardware components according to the needs of a particular implementation.

The inertial navigation unit 150 includes a processor 152 (or may use processor 140) to execute code or software to provide the functionality of a dead reckoning module 154 and to manage memory/data storage device(s) 160. The inertial navigation unit 150 is shown to include an IMU 156 that may include one or more accelerometers 157 measuring accelerations 162 of the body 110. The IMU 156 may further include one or more gyroscopes 158 measuring angular rates 163 of the body 110 during movements 115. These IMU outputs 162 and 163 are processed by the dead reckoning module 154 to generate a dead-reckoned result 164 that may include a velocity 166 of the body 110 and a position 168 in the space of the body 110, and the result 164 may further include heading and speed estimates that can be provided in the output 151 to the integration module 144.

The imaging unit (or vision-based positioning/navigation system) 170 also includes a processor 172 (or may use processor 140) to run software or execute code to provide the functionality of a dead reckoning module 174 and manage memory/data storage device(s) 180. The imaging unit 170 includes two or more cameras 176 (e.g., digital video cameras) positioned as discussed below on the body and operated to capture images external to the body 110, and these images include a frame pair 182 that is chosen or identified by the module 174 periodically (e.g., at capture time interval 183 that may match rate at which module 174 can compute its results). In brief, the vision unit 170 with its dead reckoning module 174 processes the frame pair 182 so as to identify one or more features 184 in the images 182, and each of these features 184 has a particular position 186 in each of the frames 182. A dead-reckoned result 190 is computed by comparing these identified features 184 in each frame of the pair 182 to determine a pose rate/velocity 192. This result 192 along with other data such as heading and speed estimates is provided as output as shown at 171 of the imaging unit 170.

The integration module 144 integrates the outputs 141 and 171 such as with use of filter or filtering mechanism 148 to generate navigation data 131 that is provided to the drive system 120, and this data 131 may utilize position and other data 151 from the inertial navigation unit 150 while the imaging unit 170 is processing a next frame pair 182 to provide more accurate velocity and/or position data 171 that is used to correct for accumulating error or drift in the inertial navigation unit 150. Then, with this correction, the inertial navigation unit 150 again provides the navigation data 131 until a next frame pair 182 is processed to provide a new dead-reckoned result 190 with its more accurate pose rate or velocity 192 that is provided in the navigation data 131 to the drive system 120.

With the navigation system 130 generally understood, it may now be useful to describe in more detail exemplary implementations of the system 130 and its components such as the integration module 144, the inertial navigation unit 150, and the imaging unit 170. In some embodiments, the integration module 144 with its filter 148 provides low effort vision-based correction of the IMU 156. Hence, the integration module 144 and its underlying algorithms provide a novel method for integrating a vision system and an IMU in such a way as to accommodate the unique challenges of each technique of navigation while exploiting the benefits of each. One goal for the navigation system 130 is to develop a practical and lower cost implementation rather than one rigorously optimized for maximum performance.

The properties of an IMU are well understood. An IMU typically contains some number of accelerometers and some number of gyroscopes for measuring rotation. The accelerometers, even in a relatively low performance IMU, are extremely accurate. The limitation of an IMU lies in the fact that in order to determine a position, the accelerations are first integrated into a velocity and then integrated again into a position. This results in a position error that will grow proportional to the square of time. Once errors in heading are included in the solution (or output of the inertial navigation unit), the error growth rate can become closer to a function of time cubed. It is common to perform zero velocity updates (or ZUPTs) to limit the growth of the drift.

The properties of a computer vision-based positioning system (or CV system) are less familiar and are still being characterized to some extent. A CV system is capable of measuring three translational dimensions and three rotational, with much of the emphasis in the following discussion being the translation measurements of the CV system. CV system measurements will be somewhat noisier that IMU measurements in the short term, but these measurements have the unique benefit that they are direct measurements of displacement and, thus, will not accumulate cubicly or quadratically in time. In an ideal case, the drift of a CV system can be constrained to be proportional to distance traveled; however, in one implementation described herein, drift will be more closely proportional to time. A limitation of CV systems is the computational effort required to calculate results, as even on desktop hardware it can be difficult or impossible to run close to real time.

The navigation systems described herein use the excellent short term performance of the IMU to dead reckon positions while the CV system is calculating. The direct measurement of velocity by the CV system is then used to do a known velocity update (KUPT) in a manner similar to a ZUPT, which serves to constrain the IMU drift. Thus, the navigation system's drift is controlled while the CV system's computational requirements are relaxed.

As discussed with regard to FIG. 1, the inertial navigation unit 150 includes a dead reckoning module 154 that produces dead-reckoned results 164 by processing outputs of the IMU 156. The IMU 156 outputs accelerations 157 and angular rates 158. In a general 6 degree of freedom (6DOF) IMU, there will be acceleration values for forward, lateral, and up and angular rates for pitch, roll, and yaw. In order to reserve (x,y,z) for the world coordinates, this discussion will use (u,v,w) for the local IMU coordinate system and $(\varphi,\theta,\psi)$ for pitch, roll, and yaw. $\varphi$ is rotation about the u axis, $\theta$ is rotation about the v axis, and $\psi$ is rotation about the w axis. Assuming the IMU is mounted on a vehicle body or other mobile body, the path can be constrained to two dimensions of translation, (x,y) or (u,v) depending, and one dimension of rotation, $\psi$.

For the test case where the sensor is static, the true motion components are simple as they are all zero:

$$s_x(t)=0 \quad s_y(t)=0$$

$$v_x(t)=0 \quad v_y(t)=0$$

$$a_x(t)=0 \quad a_y(t)=0$$

For the test case where the sensor is traveling in a circular path, the radius of the circle is r and the angular rate is $\omega$. To ensure the vehicle or other mobile body always faces the direction of travel, $\psi=\omega t+\pi/2$. The true position, s, at any time is:

$$s_x(t)=r\cos(\omega t)$$

$$s_y(t)=r\sin(\omega t)$$

Calculus gives the true velocity and acceleration:

$$v_x(t) = \frac{ds_x}{dt} = -\omega r\sin(\omega t)$$

$$v_y(t) = \frac{ds_y}{dt} = \omega r\cos(\omega t)$$

$$a_x(t) = \frac{dv_x}{dt} = -\omega^2 r\cos(\omega t)$$

$$a_y(t) = \frac{dv_t}{dt} = -\omega^2 r\sin(\omega t)$$

The circular motion gives sinusoidal components in world space, but, in polar coordinates, all three sensors would ideally emit constant values:

$$v_{mag}(t) = \sqrt{v_x(t)^2 + v_y(t)^2} = \omega r$$

$$a_{mag}(t) = \sqrt{a_x(t)^2 + a_y(t)^2} = \omega^2 r$$

$$v_{ang}(t) = \tan^{-1}\left(\frac{v_x(t)}{v_y(t)}\right) \qquad a_{ang}(t) = \tan^{-1}\left(\frac{a_x(t)}{a_y(t)}\right)$$

$$= \tan^{-1}\left(-\frac{\cos(\omega t)}{\sin(\omega t)}\right) \qquad = \tan^{-1}\left(\frac{-\sin(\omega t)}{-\cos(\omega t)}\right)$$

$$= \tan^{-1}\left(-\frac{\sin\left(\omega t + \frac{\pi}{2}\right)}{\sin(\omega t)}\right) \qquad = \tan^{-1}\left(\frac{\sin(\omega t + \pi)}{\cos(\omega t + \pi)}\right)$$

$$= \tan^{-1}\left(\frac{\sin\left(\omega t + \frac{\pi}{2}\right)}{\sin(\omega t + \pi)}\right) \qquad = \omega t + \pi$$

$$= \psi + \frac{\pi}{2}$$

$$= \tan^{-1}\left(\frac{\sin\left(\omega t + \frac{\pi}{2}\right)}{\cos\left(\omega t + \pi - \frac{\pi}{2}\right)}\right)$$

$$= \omega t + \frac{\pi}{2}$$

$$= \psi$$

Which corresponds to constant expected values on the IMU outputs:

$$a_{u_{tr}}(t)=\omega^2 r$$

$$a_{v_{tr}}(t)=0$$

$$v_{\psi_{tr}}(t)=\omega$$

With regard to IMU errors, there are a nearly endless number of potential error sources in an IMU system, but the following discussion simplifies the problem down to independent Gaussian noise parameters for u and v. ψ is assumed to be without error.

$$a_{u_i}(t) = a_{u_{tr}(t) + n_{u_i}(t)}$$

$$a_{v_i}(t) = a_{v_{tr}(t) + n_{v_i}(t)}$$

$$= n_{v_i}(t)$$

$$v_{\psi_i}(t) = v_{\psi_{tr}(t) + n_{\psi_i}(t)}$$

$$= v_{\psi_{tr}}(t)$$

$$\psi_i(t) = \omega t + \frac{\pi}{2}$$

In this case, $v_\psi$ is meant to indicate angular rate or $d\psi/dt$. The n values are noise. Additional errors stem from discretely sampling the signal in time, as discussed below. There may also be bias terms for each sensor, which are assumed to be zero here for simplicity.

Dead reckoning implements the reverse of the derivation above. Based on an initial position and sensor measurements, the system constructs a new position. The process can then be repeated using the newly constructed position as the initial position for the next point. Acceleration in IMU-space is decomposed into Cartesian world-space coordinate as:

$$a_{x_i}(t) = a_{u_i}(t) \cdot \cos(\psi_i(t))$$

$$a_{y_i}(t) = a_{v_i}(t) \cdot \sin(\psi_i(t))$$

Instead of doing a full continuous integral, an IMU is typically sampled at a given sampling rate, $f_s$. Velocity is the summation of prior accelerations times the sample period:

$$v_{x_i}(t_1) = v_{x_i}(t_0) + \sum_{k=0}^{f_s(t_1-t_0)} \frac{1}{f_s} a_{x_i}\left(t_0 + k\frac{1}{f_s}\right)$$

$$v_{y_i}(t_1) = v_{y_i}(t_0) + \sum_{k=0}^{f_s(t_1-t_0)} \frac{1}{f_s} a_{y_i}\left(t_0 + k\frac{1}{f_s}\right)$$

And position is the summation of prior velocities:

$$s_{x_i}(t_1) = s_{x_i}(t_0) + \sum_{k=0}^{f_s(t_1-t_0)} \frac{1}{f_s} v_{x_i}\left(t_0 + k\frac{1}{f_s}\right)$$

$$s_{y_i}(t_1) = s_{y_i}(t_0) + \sum_{k=0}^{f_s(t_1-t_0)} \frac{1}{f_s} v_{y_i}\left(t_0 + k\frac{1}{f_s}\right)$$

Figure 2:
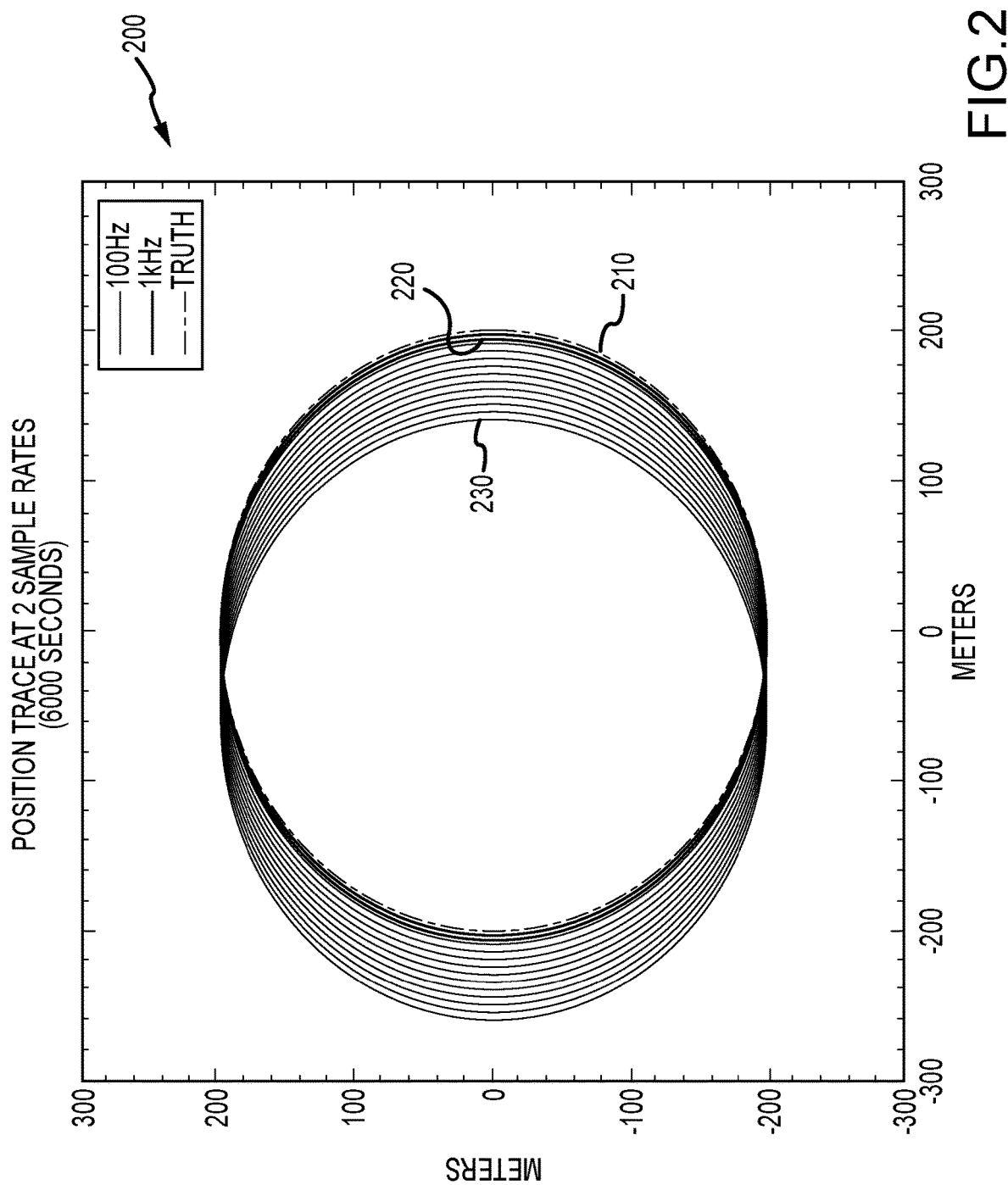
FIG. 2 illustrates a graph showing an IMU position track at two sample rates.

With regard to errors due to sampling, even without noise on the accelerometer signal, there will be some error in the dead-reckoned result due to the discrete time sampling of acceleration. For an IMU traveling a circular path, the acceleration vector is changing continuously, but the system samples that acceleration periodically and assumes the value to be constant throughout the sample period. More sophisticated filtering techniques can be used to mitigate this to some extent, depending on the acceleration profile, but one useful technique is to employ the naive approach. FIG. 2 illustrates a graph 200 showing an IMU position track at two sample rates. In the graph 200, the dashed circle 210, which is centered at (0,0) with a radius of 200 meters, indicates the true path of the IMU on the moving body. The thicker line path 220 shows the error over the course of 6000 seconds when sampled at 1 kHz, and the thinner line path 230 shows the significantly greater error when sampled at 100 Hz. In the static test case, this is not an issue because the acceleration remains constant (and zero) throughout the sample period.

Figure 3:
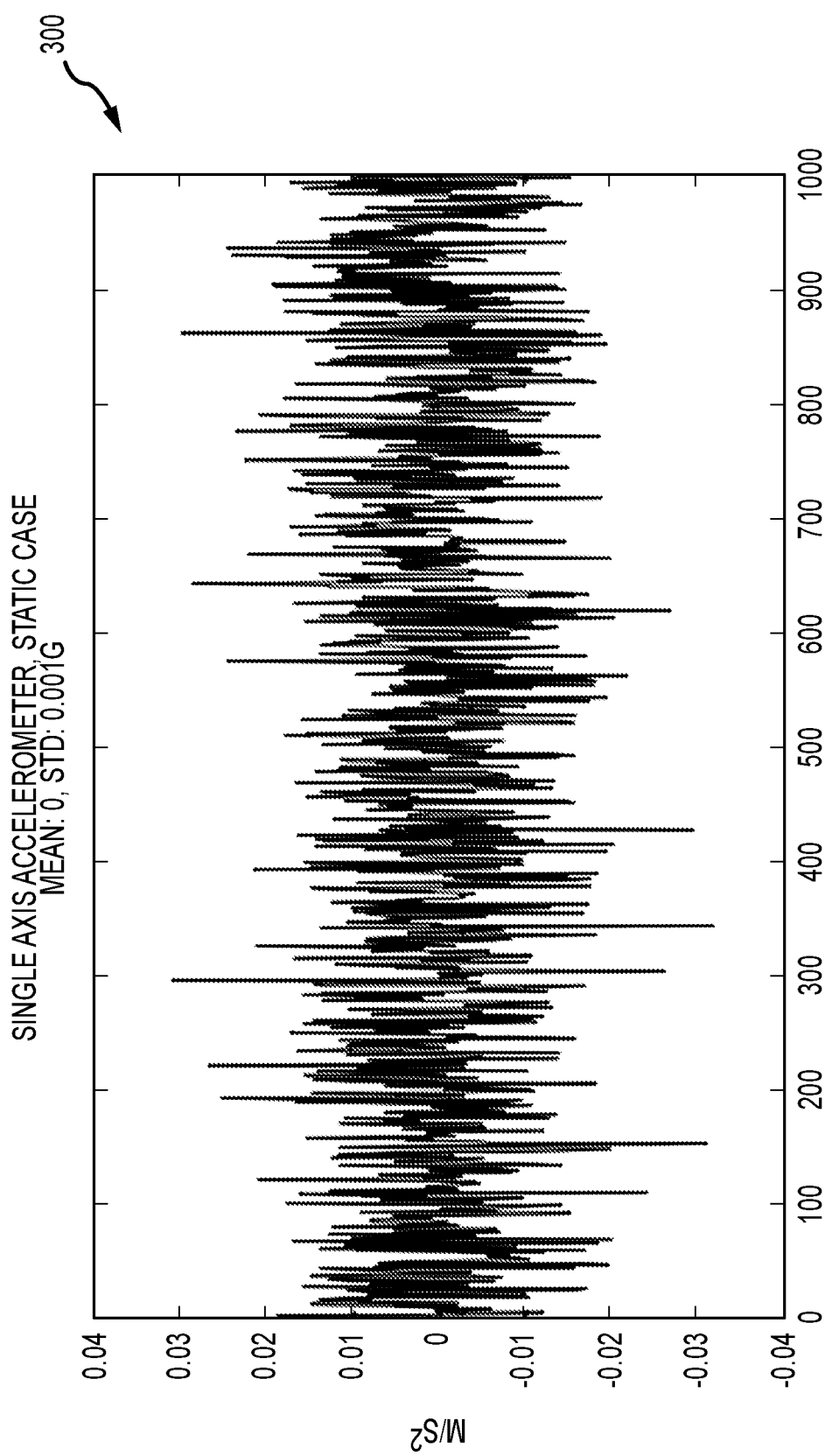
FIG. 3 provides a graph of a static case/use of a single axis accelerometer.
Figure 4:
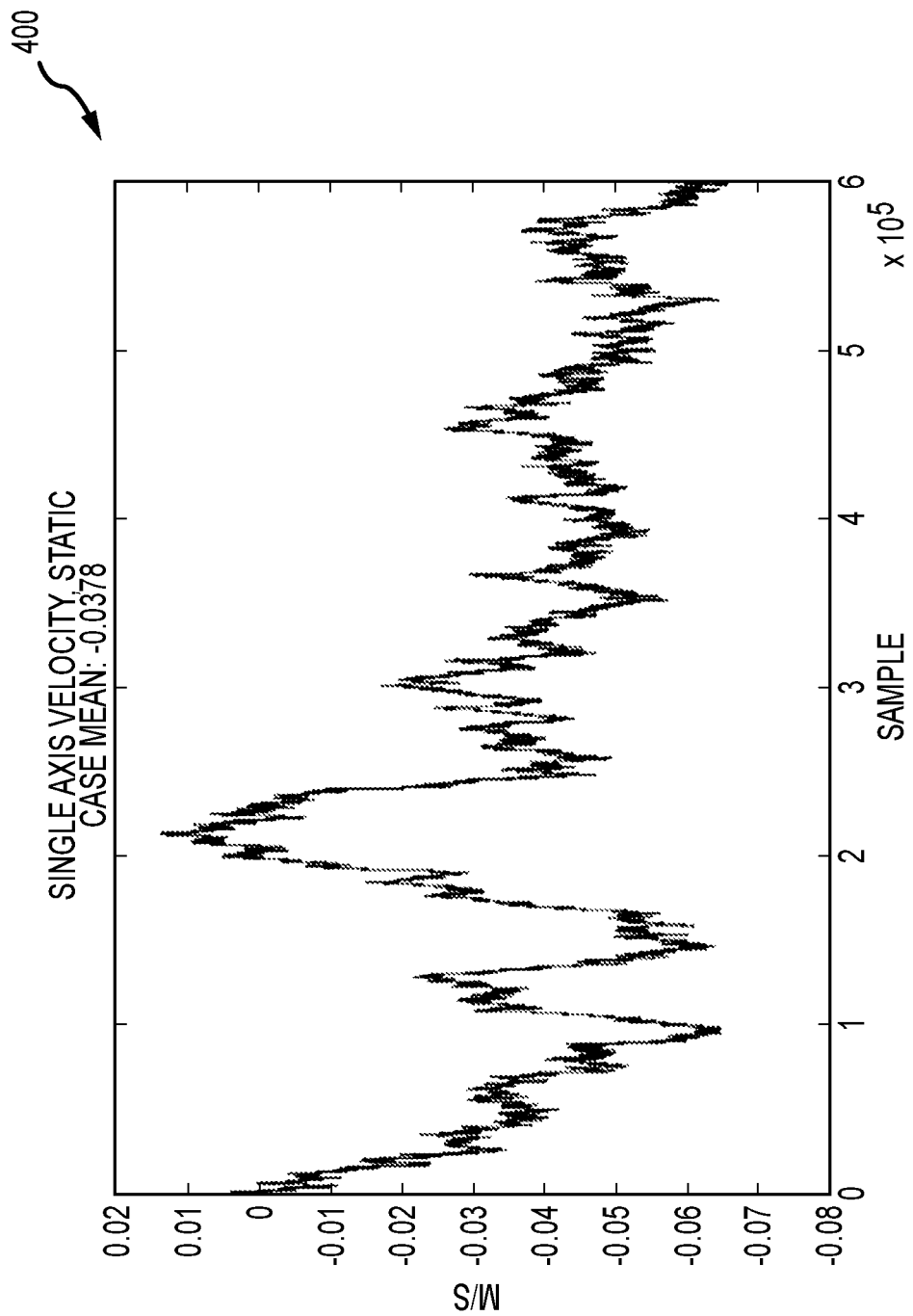
FIG. 4 is a graph or plot of accelerometer values integrated into velocity values.
Figure 5:
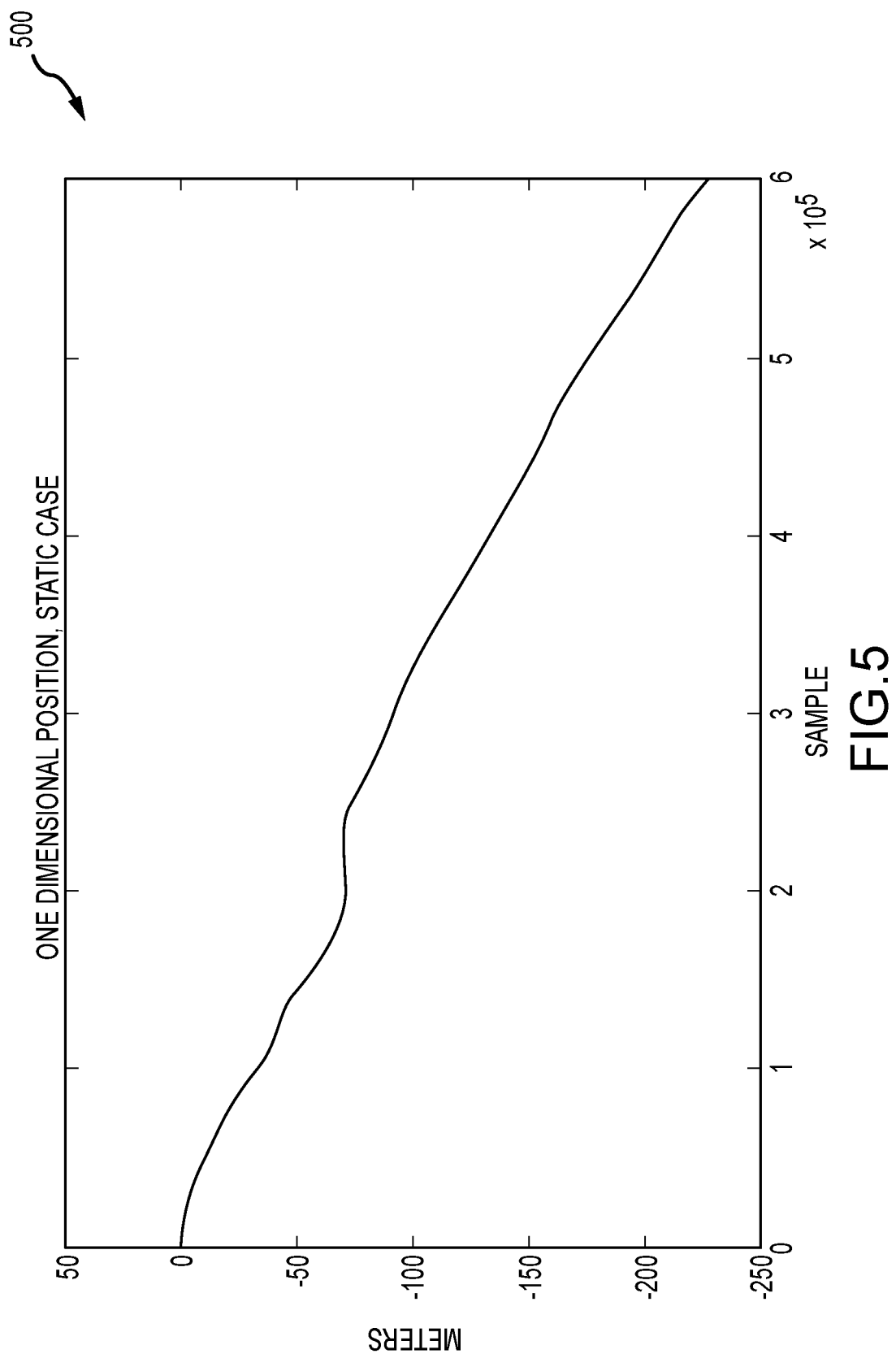
FIG. 5 is a graph or plot of results of integration of the accelerometer outputs into position values.

With this in mind, one can consider random walk growth in velocity error by looking at the noise on the accelerometer. FIG. 3 provides a graph 300 of a static case/use of a single axis accelerometer. The graph 300 shows simulated accelerometer values with a mean of zero and a standard deviation of 0.001 g. Tracing the noise through the dead reckoning calculations as shown with graph 400 of FIG. 4, the accelerometer values are integrated into velocity values which exhibit a random walk with a non-zero mean, whereas truth would be a velocity of zero. The velocity then integrates into a position as shown with graph 500 of FIG. 5, with significant error growth.

Figure 6:
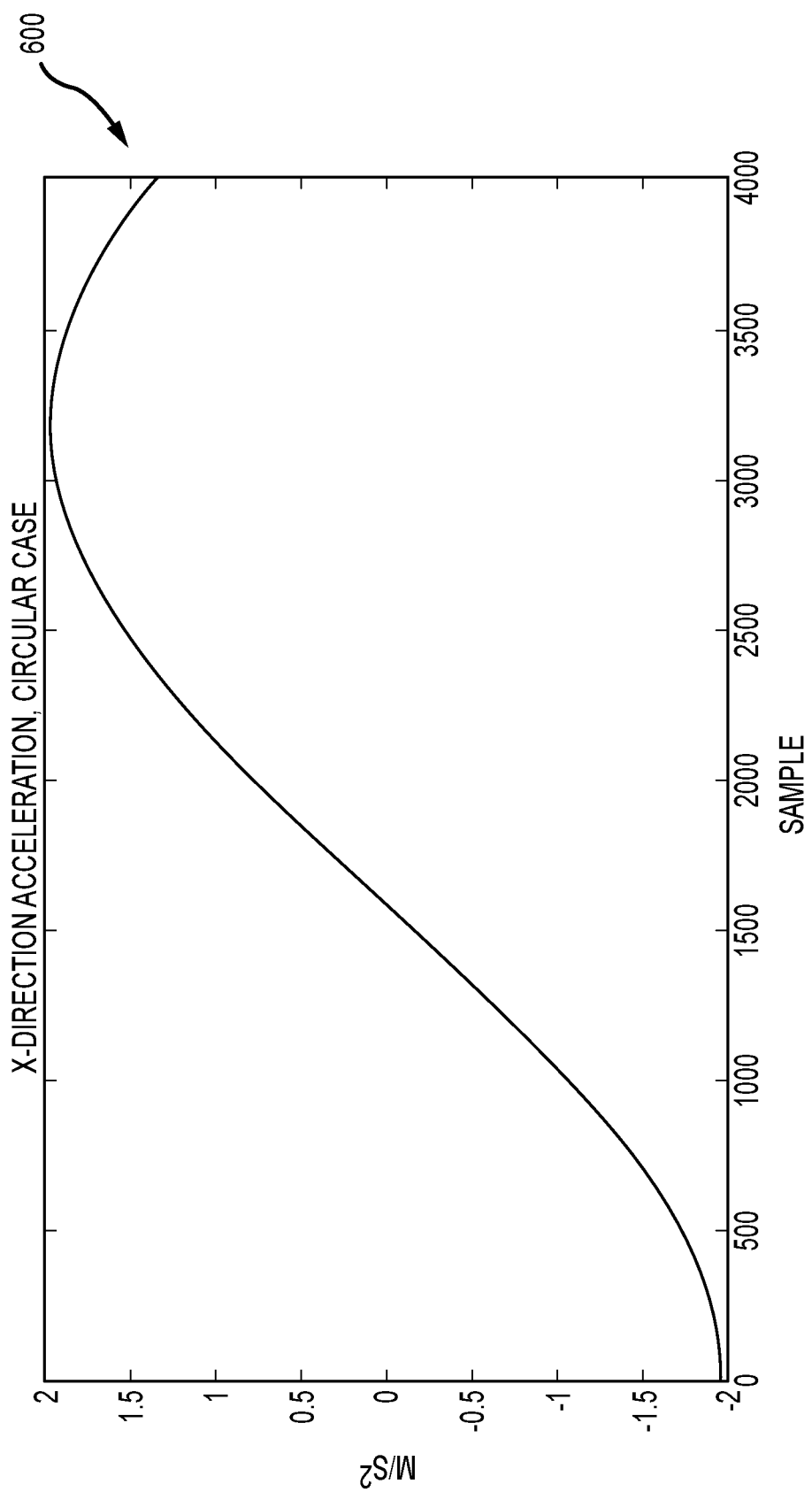
FIG. 6 is a graph or plot of x acceleration in a circular test case of an accelerometer of an IMU.
Figure 7:
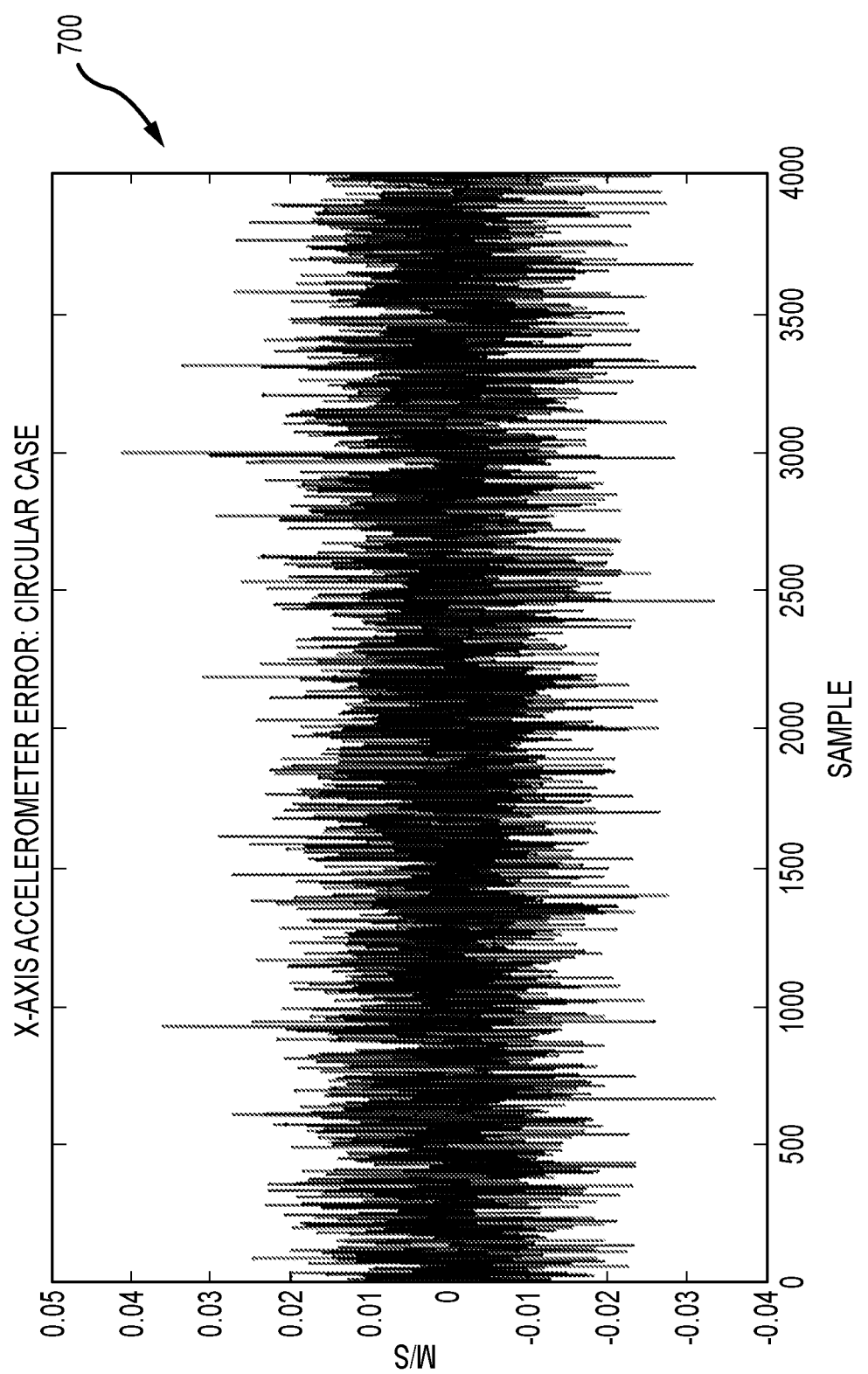
FIG. 7 is a graph or plot showing accelerometer error for the case of FIG. 6.
Figure 8:
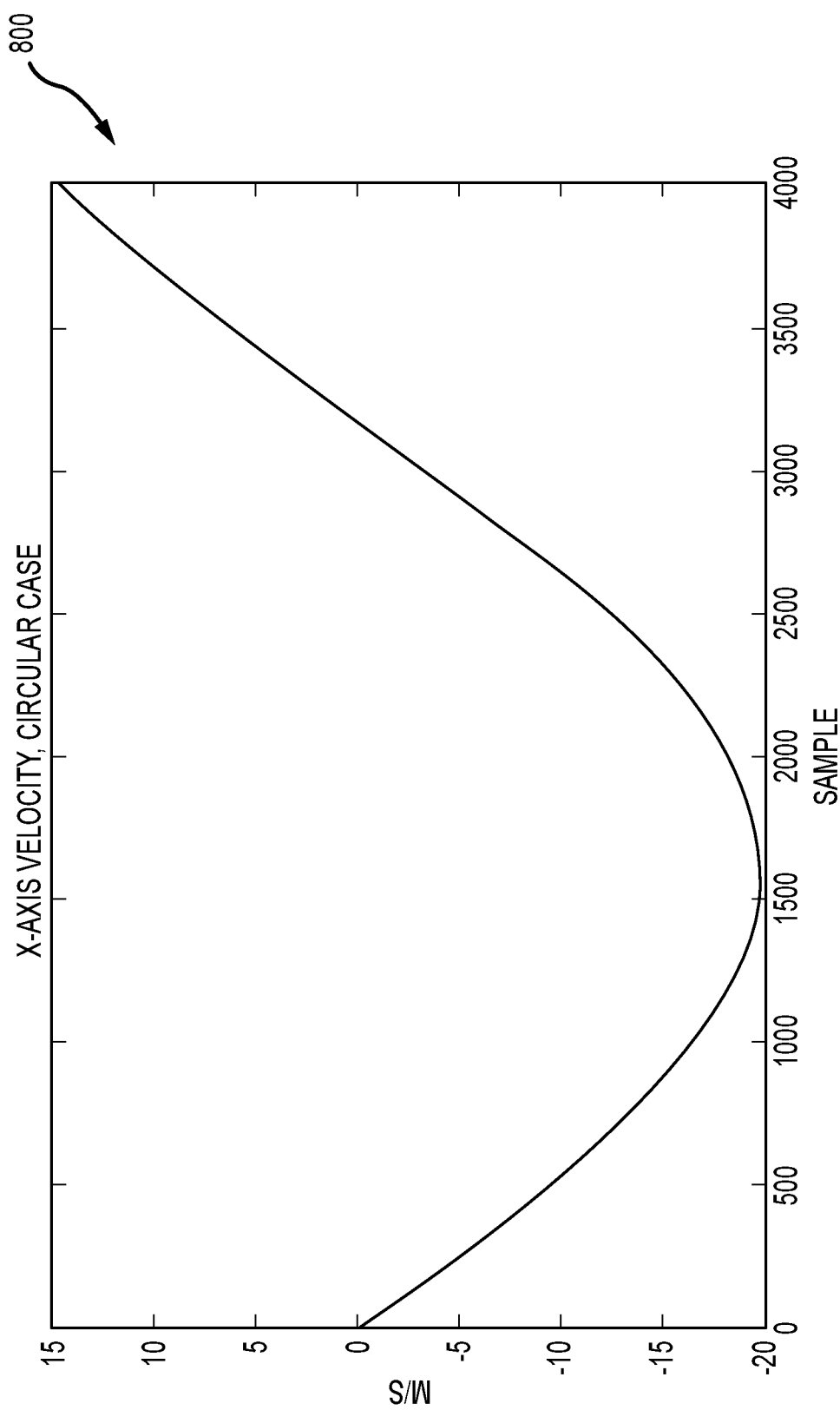
FIG. 8 is a graph or plot of results of integration of accelerometer outputs of FIG. 6 into velocity.
Figure 9:
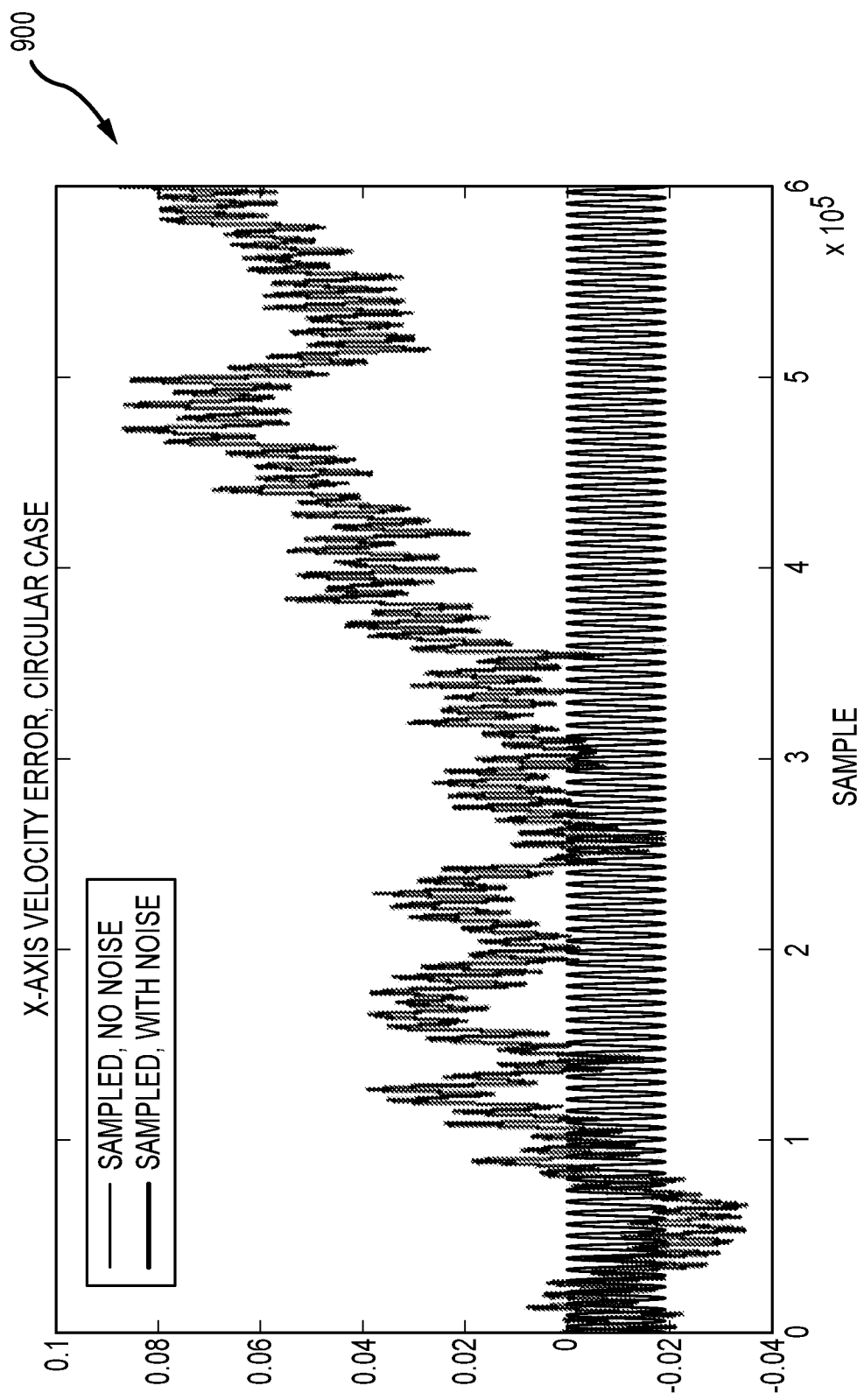
FIG. 9 is a plot or graph of velocity of error in the circular test case.
Figure 10:
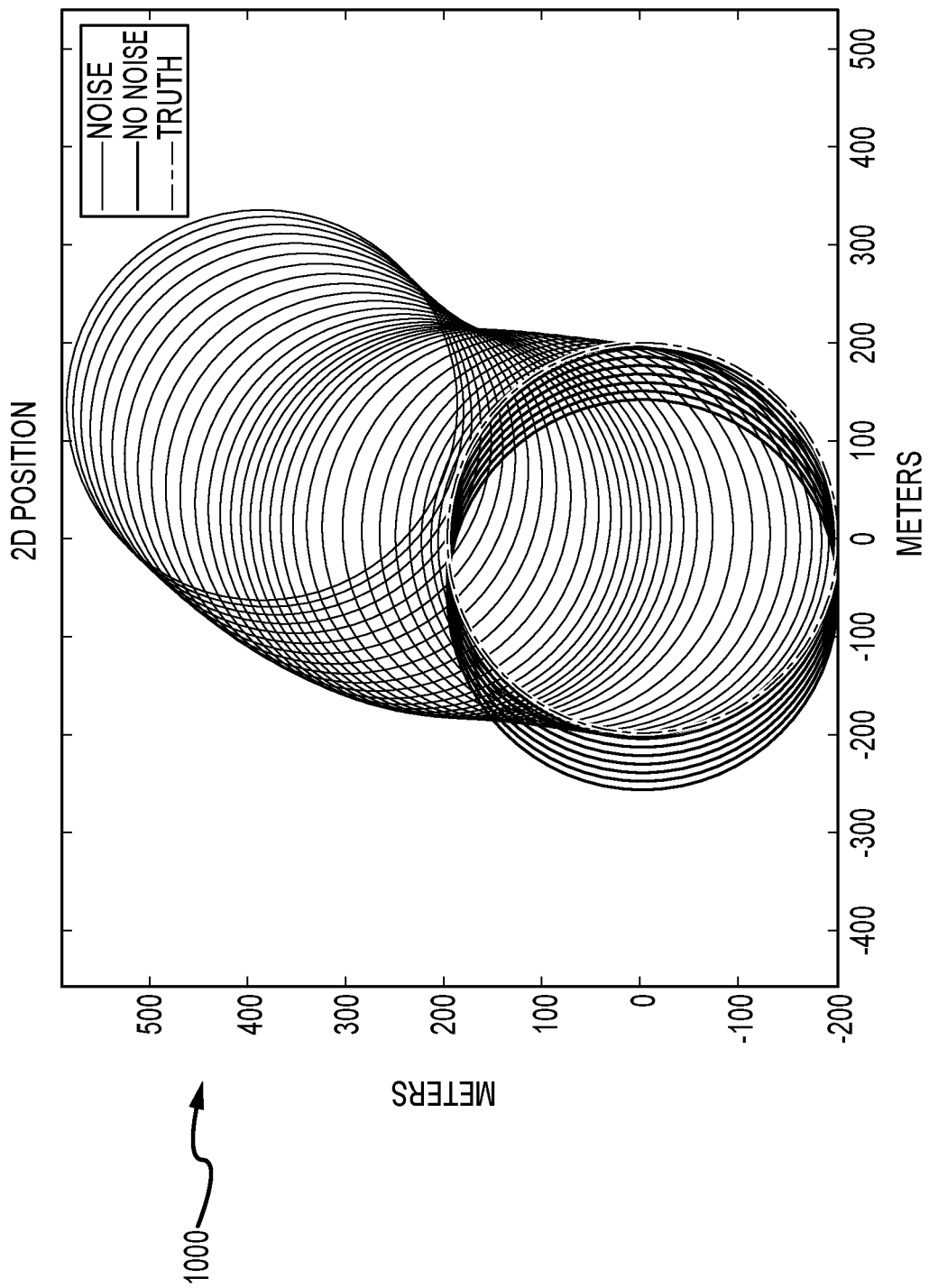
FIG. 10 is a graph showing the full 2D position track for the circular test case.
Figure 11:
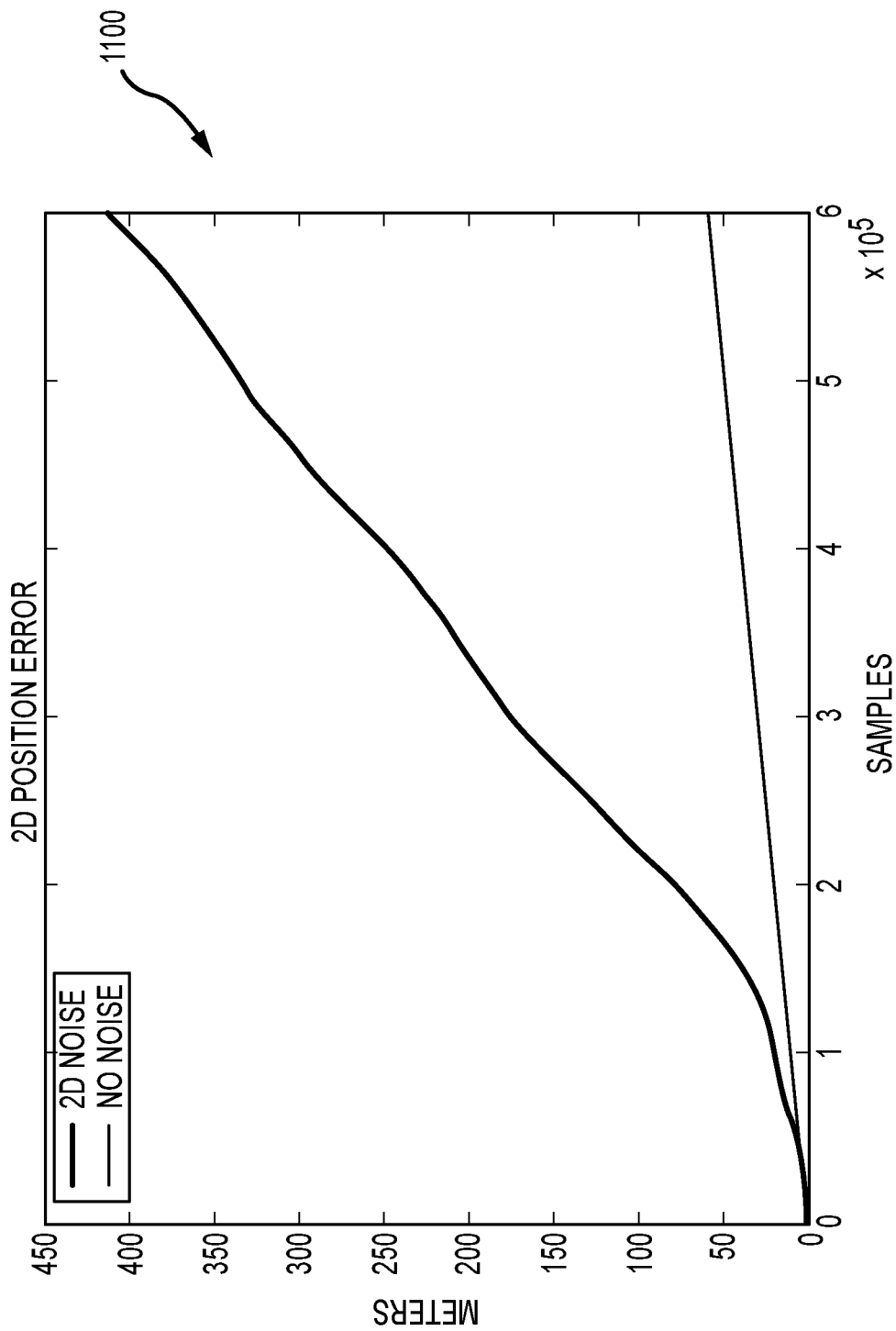
FIG. 11 is a graph of the error from truth over time for the track of FIG. 10.

The same pattern occurs in the circular test case. FIG. 6 provides a graph or plot 600 of x acceleration, shown to give an indication of the magnitude of the noise relative to the signal, and FIG. 7 provides a graph or plot 700 showing accelerometer error. This can be integrated into a velocity as shown with graph or plot 800 of FIG. 8, and the velocity error, shown in plot or graph 900 of FIG. 9, also contains an oscillation due to the sampling of the signal. FIG. 10 is a graph 1000 showing the full 2D position track for the circular test case, and FIG. 11 is a graph 1100 of the error from truth over time for the track of FIG. 10.

At this point in the discussion, it may be useful to explain operations of a dead reckoning module (such as module 174) to provide dead reckoning with a computer vision-based positioning/navigation system (such as system 170 in FIG. 1). There are multiple methods of dead reckoning using computer vision, using either 3D or 2D inputs, that may be utilized to implement the present invention and its navigation systems. The following provides two useful methods that use 2D images, and one skilled in the art will recognize that the descriptions are less formal than those provided above because full derivation, although significantly more complex and varying with implementation, is well understood in the field of vision-based navigation and related processing of images.

Figure 12:
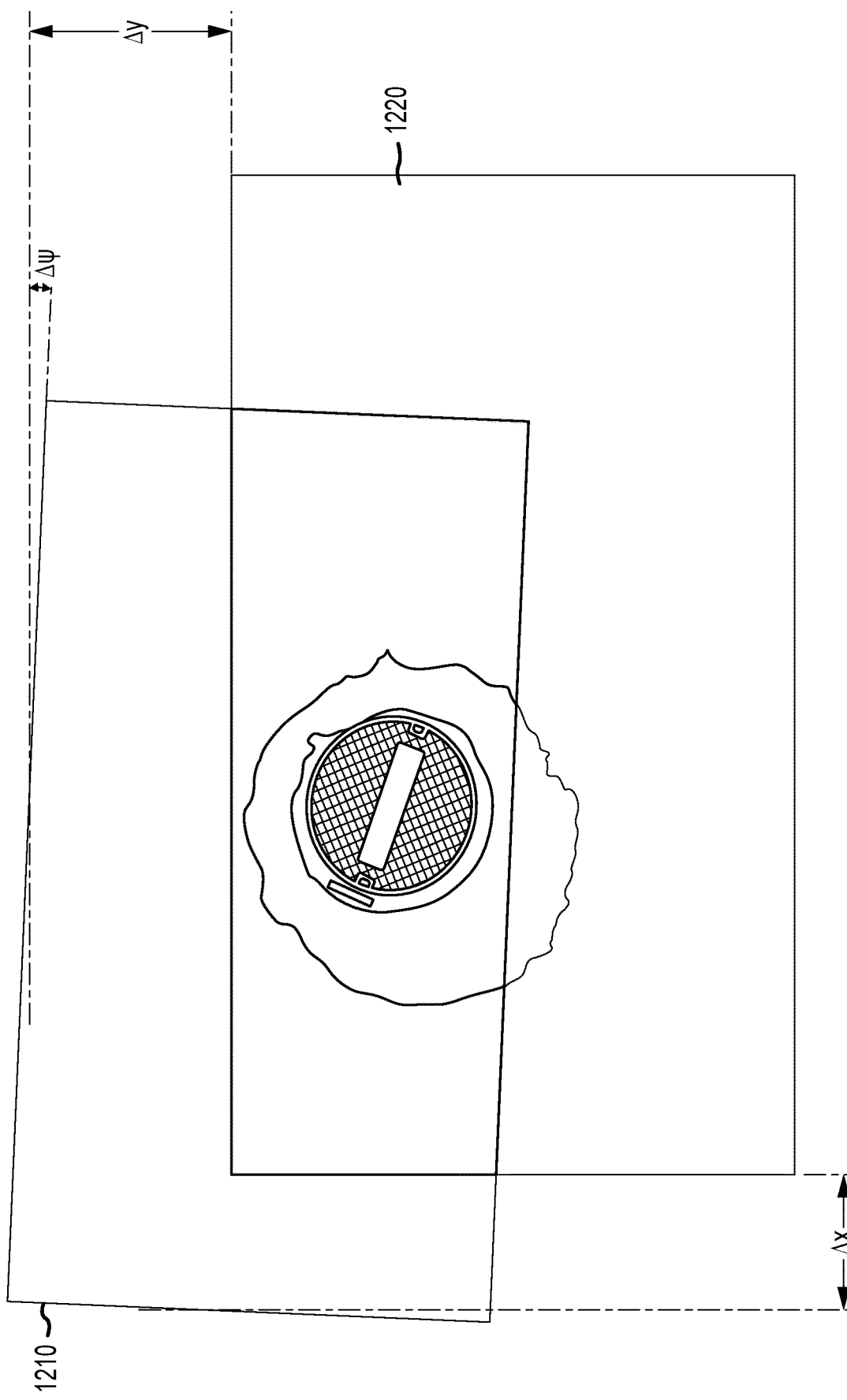
FIG. 12 illustrates two sequentially captured images from a camera (e.g., a frame pair from a camera(s) of a vision-based positioning system.

One dead reckoning technique involves optical flow. Optical flow measures movement in the light and dark regions of an image, and it assumes that such movement implies motion in what is being imaged. By adding the assumptions that what is being imaged is rigid and planar, one can simplify the calculations. The optical flow mechanism can be expressed visually as shown in FIG. 12 with first and second images 1210 and 1220 (e.g., a frame pair) from a handheld camera. The dead reckoning module may determine how areas of light and dark have moved from their position in image 1210 to their position in image 1220 (e.g., these light and dark areas correspond to the color or gray intensities of the pixels). If it assumed that the imaged road surface has remained static, the module can determine the camera motion. The diagram of FIG. 12 calls out the changes in x, y, and ψ. The scale of the second image 1220 was changed, which corresponds to a change in z.

Another technique for providing dead reckoning with a CV system is simultaneous location and mapping (SLAM), and, as the name implies, SLAM does two things at the same time. It maps points in the surrounding environment and determines the (typically relative) location of the camera.

With regard to a need for overlapping imagery, all image-based dead reckoning methods call for the imagery being used to include enough common scenery to support common measurements and alignment between images. If the camera moves enough between frames in a frame pair that there is no common scenery/features, then dead reckoning is not possible. In order to maintain positioning in real time, the CV system should have enough computation power to complete processing of each frame, along with the earlier data collected, before the next frame (or frame pair) is captured.

The use of multiple cameras (such as cameras 176 of FIG. 1) in a CV positioning system can be desirable for providing a variety of benefits. First, overlapping imagery from cameras with known relative orientation and baseline can allow direct estimates of scale (e.g., the size of things in the image). This is helpful in converting image-based measurements to units compatible with inertial and other sensors and in interpreting the location of points in 3D space. Second, wider, or multiple, fields of view are provided by multiple cameras that can lend geometric strength to the motion estimates. Third, using multiple cameras can allow the CV system to implement staggered shutter times, which can enable shorter time periods between captures.

With regard to correcting inertial drive using the output of a CV system, the inventive navigation methods taught herein involve using the CV system measurements or outputs to help contain the inertial drift. This is achieved in a way that does not require enough computation power to permit continuous overlap of imagery. In the new navigation method, two images (or a frame pair) are captured that do overlap. The dead reckoning module of the CV system then takes as long as needed to process the pair of images while the inertial navigator (e.g., inertial navigation unit 150 in FIG. 1) dead reckons from the last known point. When processing of the images is complete, the CV system provides an estimated change of pose between these two images, which, combined with the time interval between the capture times of the two images, provides a pose rate or velocity. This known velocity is then used (e.g., by the integration module 144 or its filter mechanism 148 of the navigation system 130 of FIG. 1) to remove the error from the inertial navigator velocity estimate with the caveat that this error is calculated at the time that the imagery was captured and not at the time that the computation is complete.

There are many ways to design an inertial navigator. For illustration purposes, a simple integrator may be used and rotations can be ignored to demonstrate the advantage of the combined solution taught herein for a new navigation system (i.e., one that combines an IMU with a CV system). The velocity estimates from the inertial system can be considered at a sequence of epochs, with each epoch including several measurement periods of the accelerometer:

At $t_0: v_0 = 0$

At $t_1: v_1 = v_0 + \sum_{t=t_0}^{t_1} a(t) + \tilde{v}_1$

At $t_2: v_2 = v_1 + \sum_{t=t_1}^{t_2} a(t) + \tilde{v}_2 = v_0 + \sum_{t=t_0}^{t_2} a(t) + \tilde{v}_1 + \tilde{v}_2$ At $t_3: v_3 = v_2 + \sum_{t=t_2}^{t_3} a(t) + \tilde{v}_3 = v_0 + \sum_{t=t_0}^{t_3} a(t) + \tilde{v}_1 + \tilde{v}_2 + \tilde{v}_3$ and so on, where the v's are the true velocities, the a's are accelerations as measured at time t, and the $\tilde{v}$'s are the velocity errors at that time (from whatever source).

At each epoch $t_n$, a frame pair is captured and the computation of the CV estimate of motion is completed at $t_{m+1}$, giving an independent estimate of velocity and an error endemic to the CV calculation $\hat{v}$. This leads to a new chain of calculations:

At $t_o$:

$v_0 = 0$

At $t_l$ before the CV calculation:

$$v_1 = v_0 + \sum_{t=t_0}^{t_1} a(t) + \tilde{v}_1$$

At $t_l$ after the CV calculation:

$$v_1 = v_0 + \sum_{t=t_0}^{t_1} a(t) + \tilde{v} + \tilde{v}_1$$

At $t_o$ before the CV calculation:

$$v_2 = v_1 + \sum_{t=t_1}^{t_2} a(t) + \tilde{v}_2 = v_0 + \sum_{t=t_0}^{t_2} a(t) + \tilde{v} + \tilde{v}_1 + \tilde{v}_2$$

At $t_o$ after the CV calculation:

$$v_2 = v_0 + \sum_{t=t_0}^{t_2} a(t) + \tilde{v} + \tilde{v}_2$$

At $t_s$ before the CV calculation:

$$v_3 = v_2 + \sum_{t=t_2}^{t_2} a(t) + \tilde{v}_3 = v_0 + \sum_{t=t_0}^{t_3} a(t) + \tilde{v} + \tilde{v}_2 + \tilde{v}_3$$

At $t_s$ after the CV calculation:

$$v_3 = v_0 + \sum_{t=t_0}^{t_2} a(t) + \tilde{v} + \tilde{v}_3$$

Figure 13:
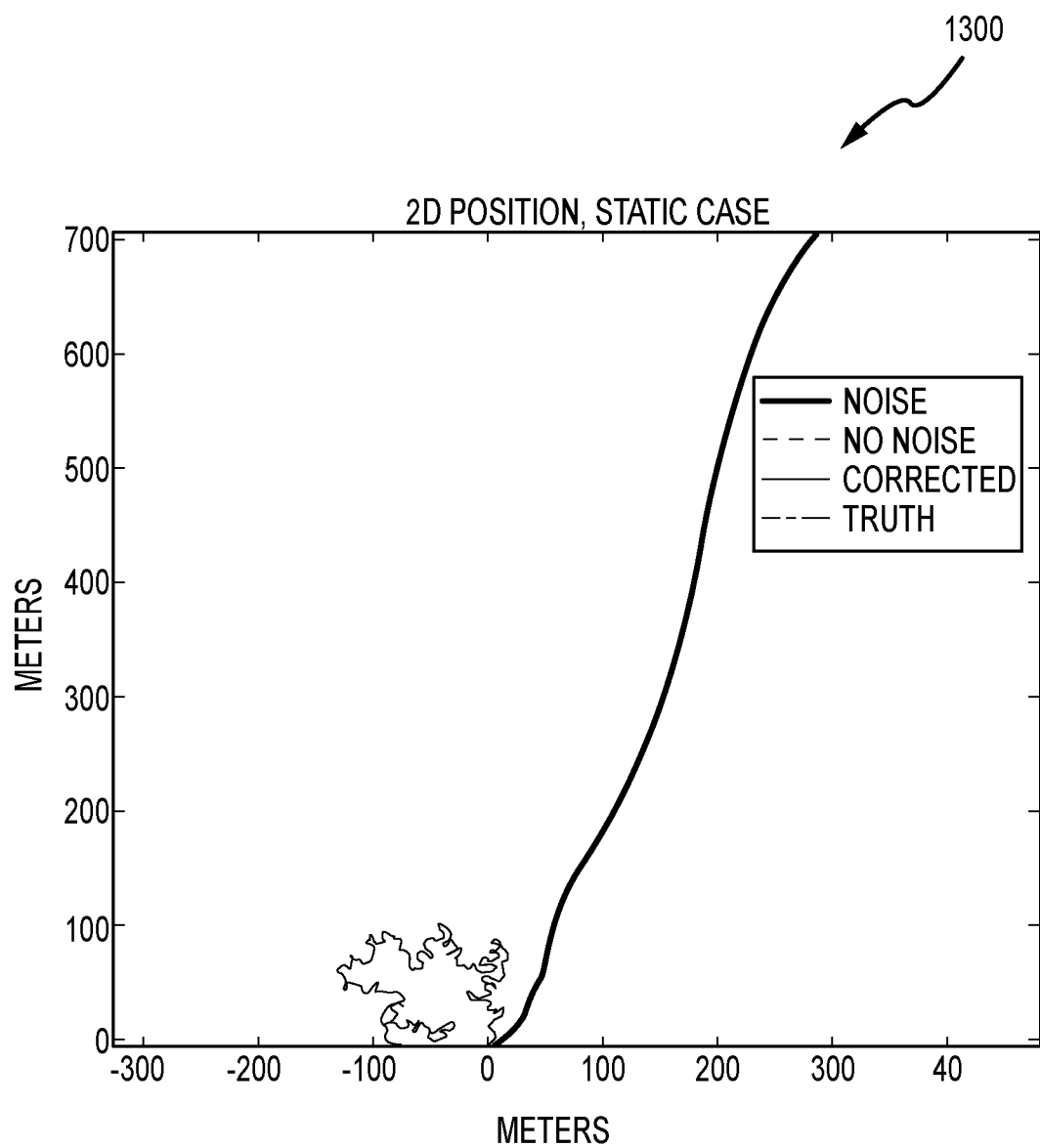
FIGS. 13 and 14 are graphs showing full 2D position tracking with when correction of inertial drift is provided via a CV system for the static and circular motion simulations, respectively.
Figure 14:
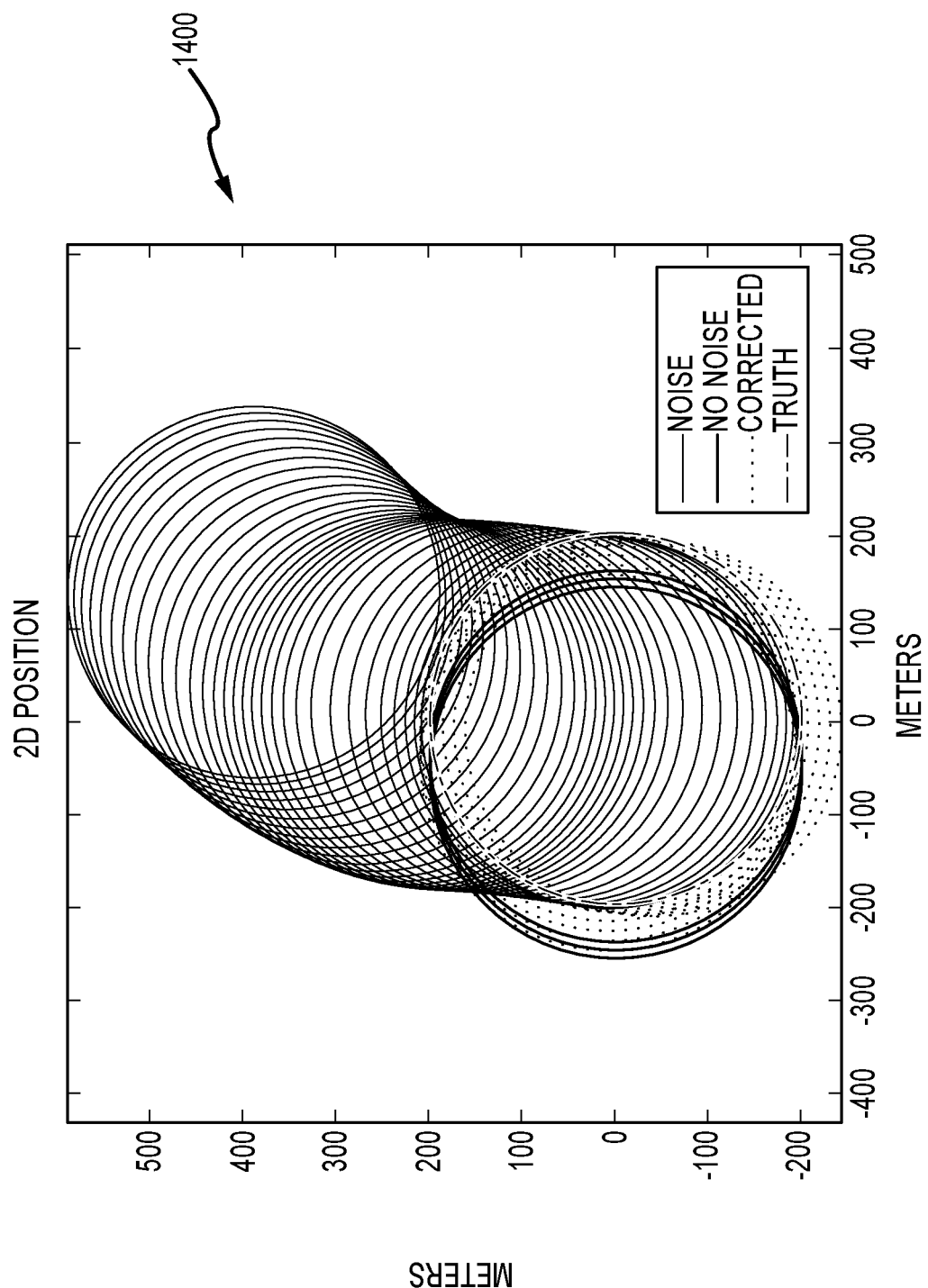

Hence, it can be seen that, while inertial based velocity errors grew linearly with time, the CV corrected velocity error is now bounded. FIGS. 13 and 14 are graphs 1300 and 1400 showing full 2D position tracking with when correction of inertial drift is provided via a CV system for the static and circular motion simulations, respectively, and the graphs 1300 and 1400 illustrate the benefit of the drift correction from the CV system (or integration of the IMU and CV systems) in similar simulations as discussed above.

Figure 15A:
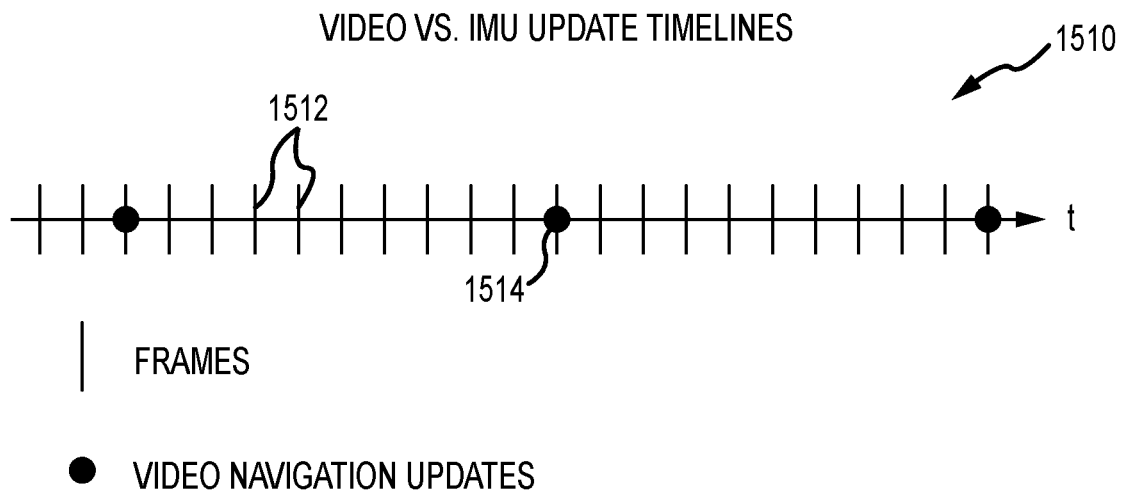
FIGS. 15A and 15B illustrate with two timelines the timing of vision-based positioning system updates to an IMU system.
Figure 15B:
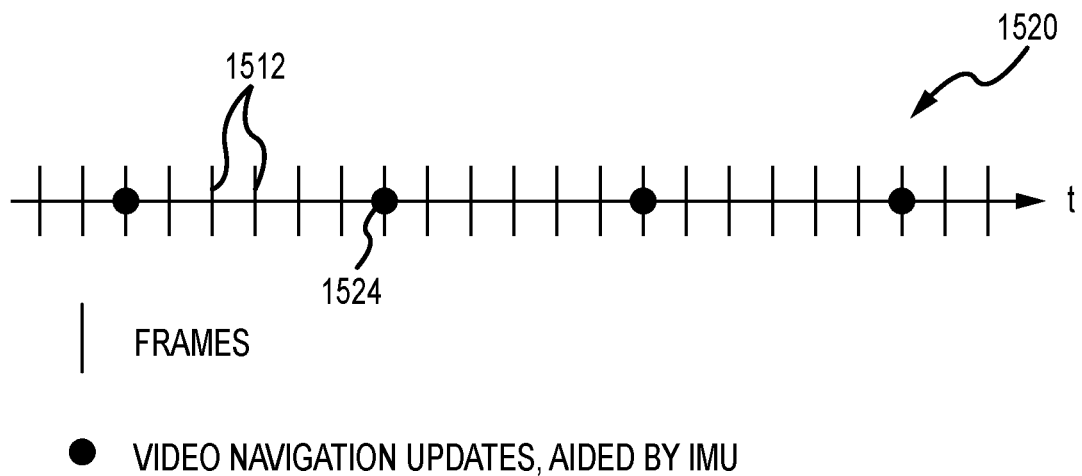

FIGS. 15A and 15B illustrate with two timelines 1510 and 1520 the timing of vision-based positioning system updates to an IMU system. In the timelines 1510 and 1520, capture of images or frames with one (or more) cameras of a vision-based positioning system are shown. Navigation updates are provided as shown at 1514 and 1524 by a vision-based positioning system. The navigation system uses output of an IMU to provide navigation between video navigation updates 1514 and 1524. On the first timeline 1510, the frame rate for capture of frames 1512 is ten times (10x) the video navigation update rate (or the video navigation rate is 0.1 times the frame rate). As shown with the second timeline 1520, more frequent video updates are possible when aided by the IMU unit. In this example, the frame rate is six times (6x) the video navigation update rate (or the video navigation rate is 0.17 times the frame rate).

Figure 16A:
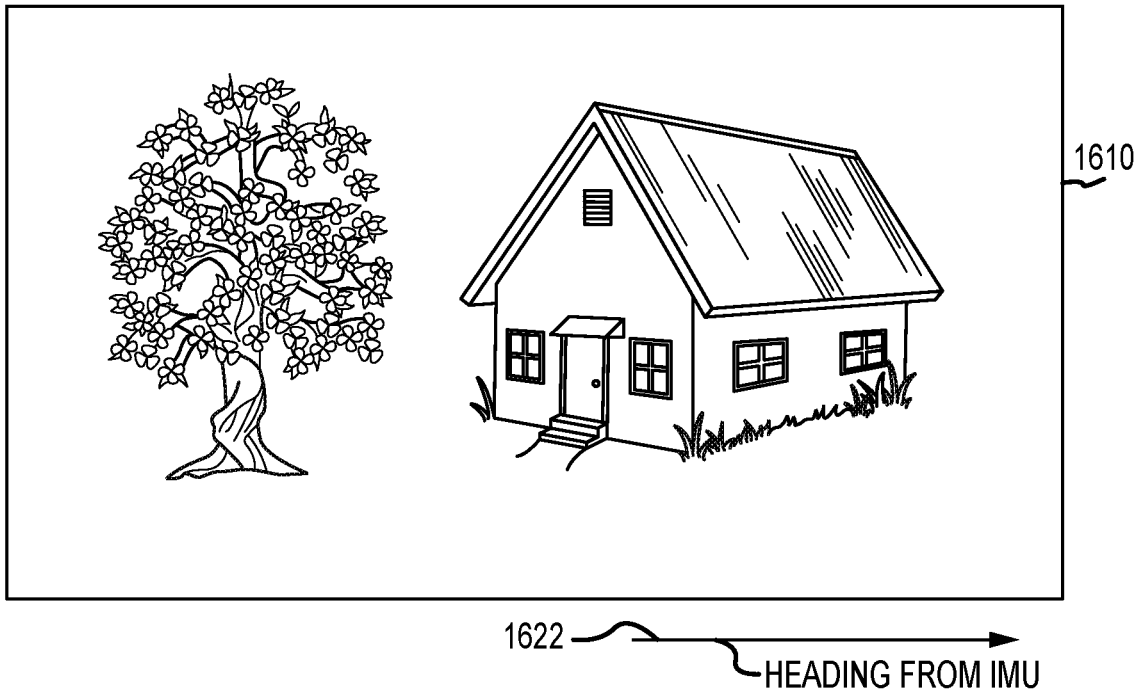
FIGS. 16A and 16B illustrate two sequentially captured images for processing by a vision-based positioning system (e.g., a frame pair) showing IMU heading data used to direct order of vision-based dead reckoning processing of the frame pair.
Figure 16B:
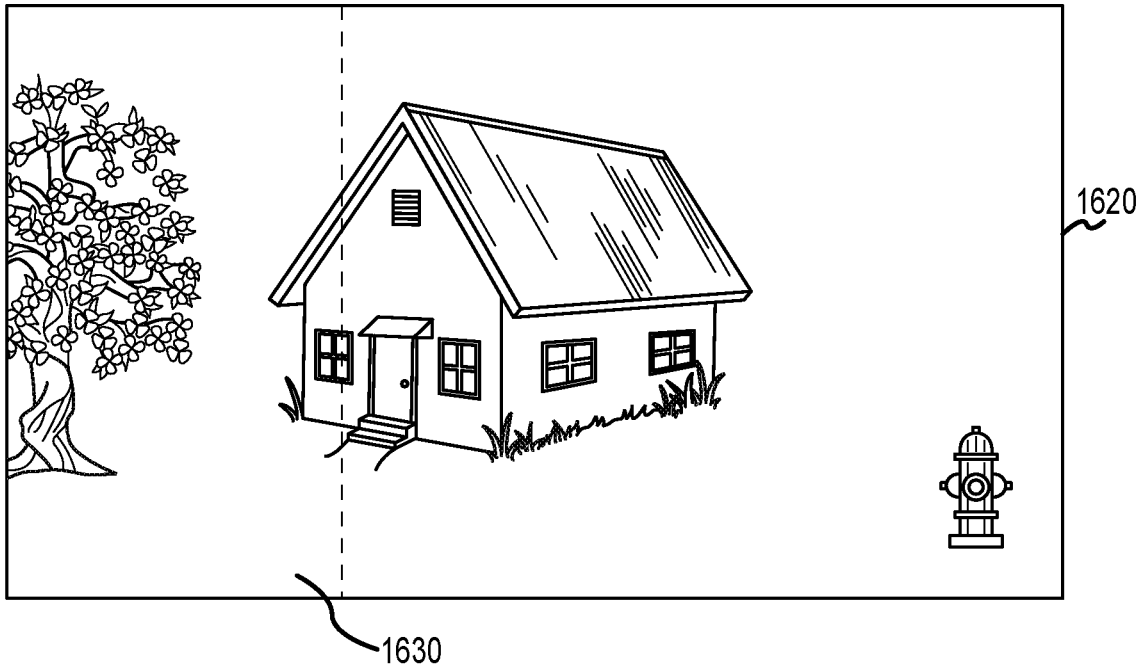

More specifically, in one example, an IMU may be used to sense a direction of a field of view movement, and a vision-based navigation system may use this heading or direction of travel information in the IMU navigation data to select which portion of image or frame pairs to process. This can be seen in FIG. 16 with first-captured image 1610 and second-captured (later-captured) image 1620. An IMU of a navigation system may be used to sense or determine a heading/direction of travel 1622 that indicates field of view movement toward the right from image 1610 to image 1620. A video navigation system may use this heading information to determine it should devote computational resources to the left side of the images 1610 and 1620 as information from the area 1630 will disappear (from later-captured images) first.

Figure 17A:
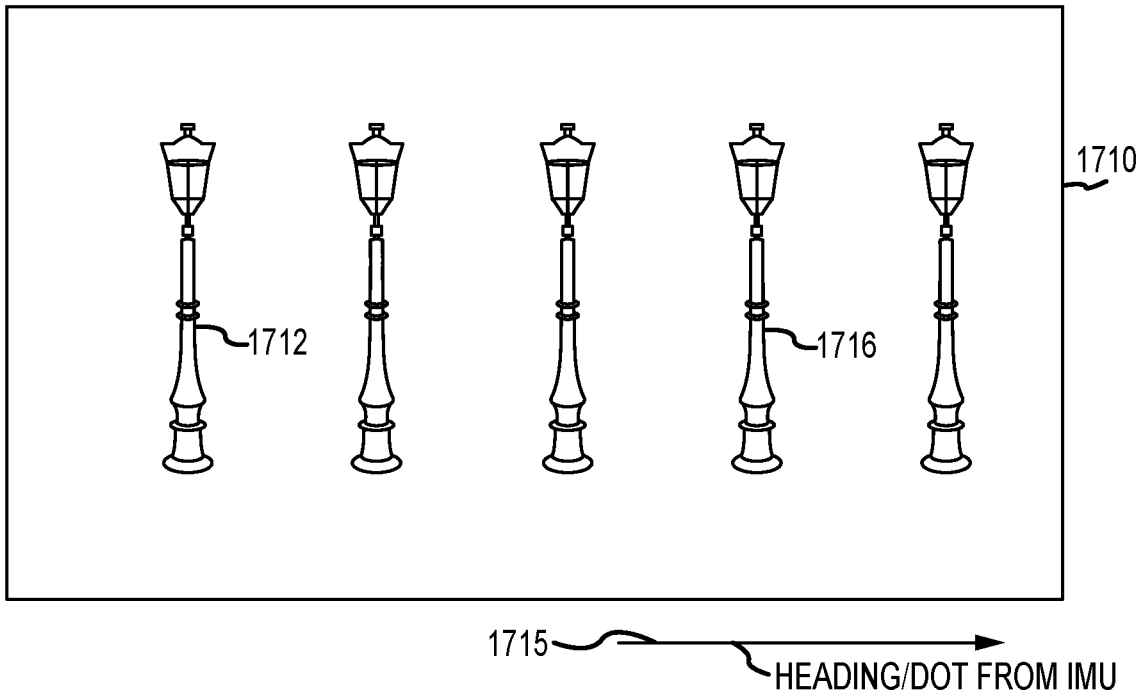
FIGS. 17A and 17B illustrate another frame pair captured by a vision-based positioning system and use of IMU data to process the video data.
Figure 17B:
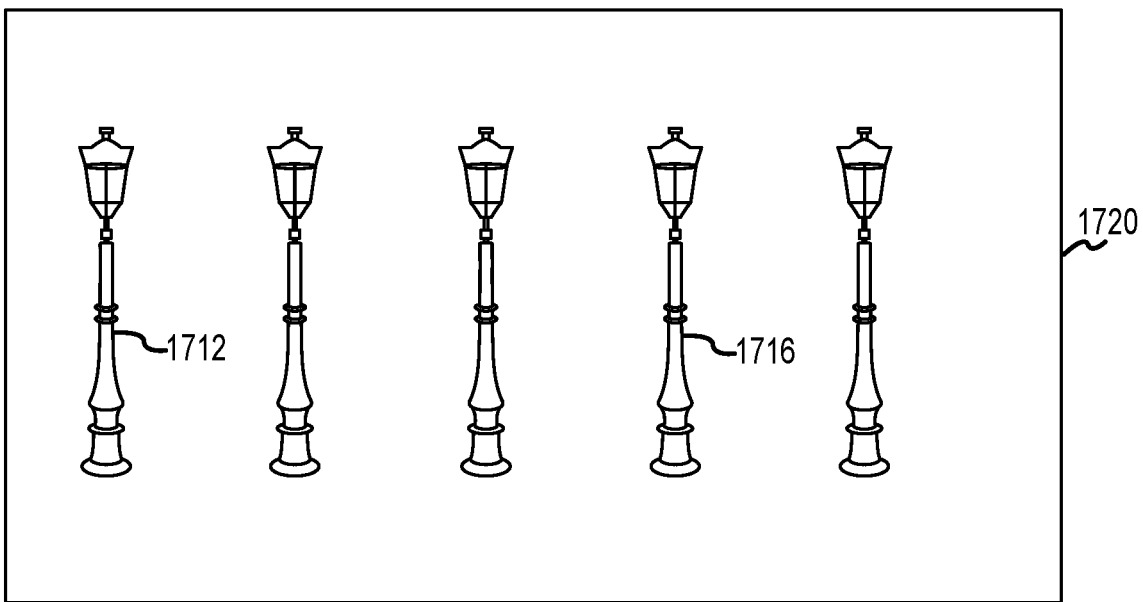

FIG. 17 shows another two captured images (or frame pair) to be processed by a navigation system of the present description. The IMU navigation data or output helps disambiguation of video data by the CV system (or video unit). Particularly, the IMU output may provide a heading 1715, and the CV system can use this information to determine matching features/elements in the images 1710, 1720 (to then determine pose rate/velocity). As shown, the images 1710 and 1720 include a number of lampposts, and the heading/DOT 1715 from the IMU navigation unit allows the CV system to identify matching lampposts in the images 1710 and 1720 such as posts 1712 and 1716 in each image/frame 1710 and 1720.

Figure 18:
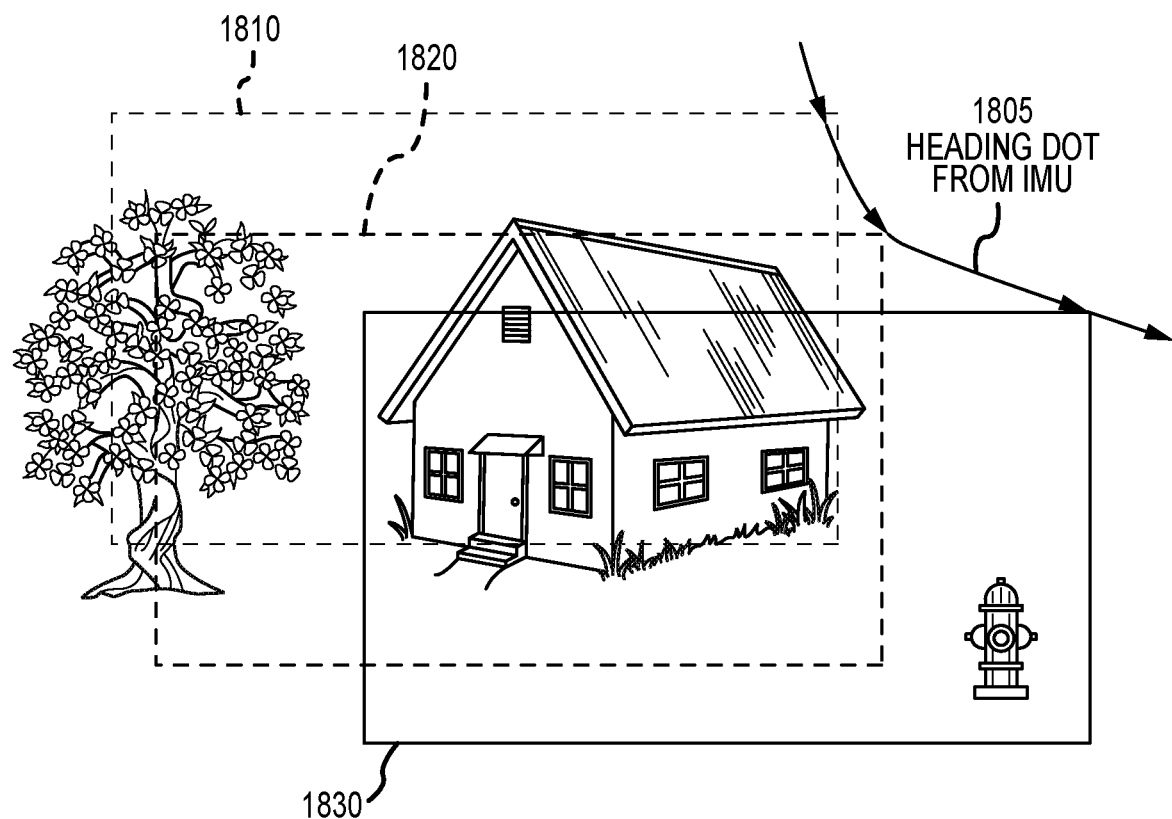
FIG. 18 illustrates a set of captured images/frames and use of IMU-provided navigation data by the vision-based positioning system to predict where new data will appear in later-captured images/frames.

FIG. 18 shows another set of sequentially captured frames/images 1810, 1820, and 1830 that are to be processed by a navigation system of the present description. An IMU can be used on a moving body carrying the camera capturing images 1810, 1820, and 1830 to sense field of view movement (or heading/DOT) as shown with arrows 1805. The vision-based positioning system (or video unit) can use this data from the IMU to anticipate where new information in each subsequent frame (frame 1820 after frame 1810 and frame 1830 after frame 1820) will appear. In this example, more of the house is visible in frame 1820 in the lower right corner than in the frame 1810, and a fire hydrant appears in frame 1830 also in the lower right hand corner that was not present in frames 1810 and 1820. This can be predicted based on the heading/DOT 1805 provided in the IMU output/navigation data.

In some embodiments, the navigation system further is configured to include software to perform post-processing. In the post-processing mode, forward/backward smoothing can be applied. The processing period can be allowed to vary with the complexity of the calculation and the available processor resources. Simple extensions allow special consideration of the static (or near static) case by detecting that the frames captured for processing period t+1 match the frames from processing period t, which further reduces the drift of the video solution. IMU measurements can be fed into the VN unit or system (also labeled CV system and video-based positioning/navigation system) to reduce the computation effort required to match frames. The algorithm can be further extended to recognize loop closures including recognizing that the system has returned to a starting point.

The navigation systems may implement a variety of vehicular camera architectures to implement the ideas taught herein including vision-based navigation integrated with inertial navigation. Vehicles present a unique environment for vision-based navigation. The speeds of movement, the proximity to other vehicles, the mass of the vehicle, and the environments the vehicle positions itself within are all quite different from applications such as drones or handheld devices.

With regard to scene selection, there are several choices of scene, as far as what the camera is looking at. SLAM, for example, has benefits such as the ability to close loops by recognizing scenes we've already seen. With regard to surface tracking, one characteristic of being in a passenger vehicle is that there is typically a relatively smooth road beneath it that is suitable for surface tracking techniques similar, but not limited, to those described in U.S. Pat. No. 8,229,166, which is incorporated herein in its entirety by reference. Looking down at the road provides several key advantages including: (a) predictability as the road will always be there; (b) correlated motion because there is less opportunities to be confused by objects in the scene moving in ways that do not reflect the motion of the camera (and vehicle it is attached to); and (c) 2D surfaces give features that do not change appearance with perspective.

With regard to camera placement on a vehicle body, among the interesting locations to place the navigation cameras would be: (a) rear view mirror: providing a view forward and protected by the windshield which will typically be maintained by the driver to establish a clear view; (b) rear bumper/trunk/license plate area: gives a clear and more open view of the ground and is in a position to see more road surface between the tracked vehicle and surrounding traffic; (c) side-view mirrors as this gives a clear view down and out to both sides; and (d) under the vehicle, which gives a predicable view with more predictable lighting (or lack thereof).

With regard to camera count in a navigation system, a camera-based (or vision-based) navigation system can benefit in different ways from incorporating multiple cameras. All multiple camera systems can benefit from the redundancy of multiple sensors. When using multiple overlapping cameras, overlapping views can give the system a direct estimate of scale in the imagery that is captured. By knowing the camera orientations and relative locations, the precise size of objects in the view can be determined by the system (e.g., by its dead reckoning module or other software). Alternatively, or in addition, multiple overlapping views can help mitigate rolling shutter effects if the sensors are arranged in a way that the rolling shutter affects the image differently in each sensor. For example, if one camera tends to shear the image to the left and the other is mounted so that the rolling shutter if rotated 180 degrees and shears the image to the right, then the system can determine the correct un-sheared image. At the same time, if the magnitude of the image shear is determined, then it can serve as a measurement of the relative motion between the camera and the scene.

In some embodiments of a navigation system, it may be useful to implement multiple non-overlapping cameras for the benefits it provides. These benefits include: (a) more cameras increase the likelihood that at least one has a view of a trackable scene; (b) more cameras lessen the chance that all cameras are equally effected by sunstrike or other exposure challenges; (c) a wider field of view gives more geometric strength to the positioning solution; and (d) some vision-based positioning techniques give greater observability to certain degrees of freedom in camera motion. With regard to this last benefit, for example, a surface tracking camera may be strongest when tracking motion perpendicular to the camera axis and rotation around the camera axis, and it may be weaker in the other dimensions. Having an additional camera mounted to align its strong dimensions with the weaker dimensions of the first camera will improve the strength of the overall system. If one camera is looking toward the front of the vehicle and a second camera is looking toward the back, the system can track the motion of scenes from the front camera as they reappear in the rear camera to extend the continuity of tracking.

With regard to optical design of the navigation system, it may be useful to utilize tilted optics. Tilting the lens axis relative to the plane of the sensor can shift the focal plane according to the Scheimpflug principle. Such a design, when mounted on a vehicle with a predicable attitude relative to the surface of the road, would allow the road surface to be kept in focus from the vehicle outward rather than having the focal place intersect the road surface at a particular distance and causing the surface to be out of focus nearer to and further from that line of intersection.

With regard to artificial illumination in the navigation system, lighting often will be unpredictable in vehicle applications due to time of day, weather, overpasses, tunnels, and the like. The ability to artificially illuminate may be provided on the vehicle in the navigation system as such lighting of the scene extends the useful working envelope of the system. Lighting may be designed to take into account the vehicle drivers comfort and safety and that of other drivers on the road and pedestrians nearby. Infrared (IR) lighting would allow illumination that the image sensor could detect but that would not be visible to humans, reducing distraction.

In some cases, it may be useful to include RGB IR lighting in the artificial illumination assembly of the navigation system. Silicon and other image sensors are naturally sensitive to infrared light, but it is typically filtered out in photographic cameras. For cameras dedicated to navigation, this filter could be removed to increase sensitivity to IR. For monochrome cameras, the entire sensor could be sensitive. Monochrome sensors have the additional advantage of not filtering out specific colors per pixel therefore accepting more light into the pixel allowing operation in lower ambient light. For color cameras, which typically have individual color filters over pixels in a pattern similar to the Bayer pattern or some other known method, one or more of the color filters could be extended to permit IR to pass through—for example the red (or some other) pixel filters could be widened to accept infrared in addition to red light. Photographic image sensors often have twice as many green pixels as they do red and blue because the human eye tends to be more sensitive to green light. Half of those green pixel filters could be removed and left unfiltered to permit more light of all colors including infrared into the pixel.

With regard to combinations with depth cameras, so called "depth cameras" may be included in the navigation system as they provide illumination to the scene in such a way that the camera can determine a distance to each pixel. This may be a structured light pattern that is used to resolve depth, or a strobe intended for measurement of time of flight. If an RGB sensor leaves one of 4 pixels (or some other ratio) unfiltered, the sensor can integrate IR depth sensing into the RGB camera. In addition to the other benefits of global shutter, it also permits synchronization with short but intense pulse lighting making it easier to use depth cameras in varying ambient light.

With regard to maintenance of the navigation system, a camera used for navigation can be adapted or designed to be able to detect when its view has been obscured by dust, dirt, water, or lens damage and, in response, to notify the driver, vehicle safety systems, or both. Likewise, the camera may be adapted or designed to be able to detect if it is being blocked by a towed trailer or other object and, in response, to provide corresponding notification to the driver, vehicle safety systems, or both.

The rolling shutter compensation module 142 of the navigation system 130 of FIG. 1 may be implemented with a number of useful functions to correct problems associated with use of image sensors 176 using rolling shutter image capture to capture the frame pairs 182. For certain geometries, under certain dynamics, and with certain external aiding information, the lost information (due to rolling shutter image capture) can be recovered by the module 142.

With the camera looking at a smooth continuous surface, there is less 3D information to be processed. The depth to a point can often be determined as a simple function of the other two dimensions. Additional sensors such as accelerometers, gyroscopes, speedometers (such as speedometer 124) and wheel rotation sensors can help the system (e.g., system 130 with rolling shutter compensation module 142) determine how the camera (such as camera 176) is moving as each row is captured. Typically, the limitation on using such sensors is that they do not have sufficient time resolution to model the camera motion with sufficient accuracy relative to the row to row timings. In a handheld application, for example, it is possible to induce enough change of acceleration to the device that interpolating accelerometer data will not accurately model the true acceleration value between measurements. This, in turn leads to errors in velocity estimates, which leads to errors in camera pose estimates at each row capture time.

Under certain dynamic constraints, the change in camera pose between row captures can more easily be recovered. When the camera is attached to a large mass, such as a vehicle body 110, for example, the system will resist rapid changes in acceleration. Under these conditions, such interpolations of sensor data will become much more reliable.

As an example of how such rolling shutter effects might be corrected (e.g., by module 142), consider a vehicle mounted camera looking at the road surface in front of the vehicle. Assume that a camera has a rolling shutter with the first row imaged furthest from the vehicle and the last row imaged closest to the vehicle. If the vehicle is stationary, the image will accurately represent the road surface in its field of view. If the vehicle begins rolling forward, then the image will start to become compressed in the direction along the road because as each row is captured the vehicle will have moved forward some amount meaning that the second row will be measured further along the row than it would have been if the vehicle were stationary. If the vehicle is moving rapidly enough, the image can become inverted because the second row may be captured far enough down the road that it is imaging a region beyond where the first row is captured.

If provided with a speedometer and accelerometer input, for example, this distortion could be reversed (by the module 142, for example) because we now know the rate of movement in the vehicle and thus the spacing between row captures. The mass of the vehicle better enforces the condition that the rate of change in acceleration is small relative to the image capture time. With regard to multiple sensors (such as cameras 176 in navigation system 130 of FIG. 1), if two image sensors are mounted in such a way that the motion of the scene relative to the camera affects each image differently, the rolling shutter effect can be better compensated for and the result can yield additional information. For example if two cameras are looking at the same scene, but one is rotated around the camera axis by 180°, then the shearing effect in each image will be in opposite directions. If one sensor shears left, for example, and the other shears right, then each can be compensated back to the correct non-sheared image. In addition, once the magnitude of the motion related shear is determined, it can be used as an estimate of the relative velocities between the camera and scene.

As can be seen by the preceding description, the inventors are addressing problems arising solely due to the recent development of computer-based navigation systems for automobiles (and other vehicles/moving bodies). Particularly, computer vision-based navigation systems have issues including computation-intensive processing and rolling shutter distortion that limited their use in many applications including navigation that requires more real time input. With these issues in mind, the inventors created a navigation system that functions much more efficiently and/or quickly to produce navigation data in real time. This navigation data may include a present position of a vehicle in a space and its current heading, and the navigation data may be input to the vehicle's drive system for display on one or more GUIs and/or for use in operating the drive system to navigate through the space.

While this disclosure contains many specifics, these should not be construed as limitations on the scope of the disclosure or of what may be claimed, but rather as descriptions of features specific to particular embodiments of the disclosure. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. A navigation system for vehicles and other moving bodies, comprising:
    an inertial navigation unit including an inertial measurement unit (IMU) and an IMU dead reckoning module processing a set of measurements provided by the IMU to generate a first output, wherein the navigation system is positioned on a navigable body with a drive system, wherein the navigation system generates navigation data for use by the drive system to move the navigable body through a space, and wherein the first output includes a first velocity and a heading of the navigable body;
    a vision-based navigation system including an image sensor sequentially capturing a pair of images of the space and further including a vision-based dead reckoning module processing the pair of images based on the heading to generate a second output including a second velocity of the navigable body; and
    a processor with an integration module processing the first and second outputs to generate the navigation data,
    wherein the navigation data includes the first velocity or a first position calculated based on the first velocity during a time period while the vision-based navigation system is generating the second output at the end of which the first velocity is modified based on the second velocity.

2. The navigation system of claim 1, wherein the vision-based dead reckoning module processes the pair of images based on the heading to process portions of the pair of images with information predicted to be lost with further travel of the navigable body or to predict portions of later frames with new information.

3. The navigation system of claim 1, wherein, after the first velocity is modified based on the second velocity, the IMU dead reckoning module processes an additional set of measurements provided by IMU to generate a third output including a third velocity of the navigable body and wherein the integration module processes the third output to generate the navigation data based on the third output and the modified first velocity.

4. The navigation system of claim 1, wherein the vision-based navigation system provides the second output at non-uniform time intervals as determined by computational loading.

5. The navigation system of claim 1, wherein the image sensor comprises at least two video cameras and wherein at least a pair of the video cameras are directed at an angular offset of 180 degrees.

6. The navigation system of claim 1, wherein the image sensor is a rolling shutter image sensor and wherein the vision-based navigation system further comprises a rolling shutter compensation module processing the pair of images based on a speed of the navigable body to reverse distortion caused by a rolling shutter effect.

7. The navigation system of claim 1, wherein the pair of images include a region of overlap.

8. A navigation system for vehicles and other moving bodies, comprising:
an inertial navigation unit including an inertial measurement unit (IMU) and an IMU dead reckoning module processing a set of measurements provided by the IMU to generate a first output, wherein the navigation system is positioned on a navigable body and wherein the first output includes a first velocity and a heading of the navigable body;
a vision-based navigation system including an image sensor sequentially capturing a pair of images of a space and further including a vision-based dead reckoning module processing the pair of images based on the heading to generate a second output including a second velocity of the navigable body; and
a processor with an integration module processing the first and second outputs to generate navigation data including modifying the first velocity based on the second velocity,
wherein, after the first velocity is modified based on the second velocity, the IMU dead reckoning module processes an additional set of measurements provided by the IMU to generate a third output including a third velocity of the navigable body and wherein the integration module processes the third output to generate the navigation data based on the third output and the modified first velocity.

9. The navigation system of claim 8, wherein the navigation data includes the first velocity or a first position calculated based on the first velocity during a time period while the vision-based navigation system is generating the second output at the end of which the first velocity is modified based on the second velocity.

10. The navigation system of claim 8, wherein the vision-based dead reckoning module processes the pair of images based on the heading to process portions of the pair of images with information predicted to be lost with further travel of the navigable body or to predict portions of later frames with new information.

11. The navigation system of claim 8, wherein the vision-based navigation system provides the second output at non-uniform time intervals as determined by computational loading.

12. The navigation system of claim 8, wherein the image sensor comprises at least two video cameras and wherein at least a pair of the video cameras are directed at an angular offset of 180 degrees.

13. The navigation system of claim 8, wherein the image sensor is a rolling shutter image sensor and wherein the vision-based navigation system further comprises a rolling shutter compensation module processing the pair of images based on a speed of the navigable body to reverse distortion caused by a rolling shutter effect.

14. The navigation system of claim 8, wherein the pair of images include a region of overlap.

15. A navigation method for vehicles and other moving bodies, comprising:
processing a set of measurements, provided by an IMU on a navigable body, to generate a first output including a first velocity and a heading of the navigable body;
sequentially capturing a pair of images of a space in which the navigable body is traveling;
processing the pair of images based on the heading to generate a second output including a second velocity of the navigable body; and
processing the first and second outputs to generate navigation data for the navigable body, wherein the navigation data includes the first velocity or a first position calculated based on the first velocity during the generating of the second output and wherein, after the generating of the second output, the first velocity is modified based on the second velocity.

16. The navigation method of claim 15, wherein the method further comprises processing the pair of images based on the heading to process portions of the pair of images with information predicted to be lost with further travel of the navigable body or to predict portions of later frames with new information.

17. The navigation method of claim 15, further comprising, after the first velocity is modified based on the second velocity, processing an additional set of measurements provided by the IMU to generate a third output including a third velocity of the navigable body and then processing the third output to generate the navigation data based on the third output and the modified first velocity.

18. The navigation method of claim 15, wherein the sequential capturing is performed by at least two video cameras directed at an angular offset of 180 degrees.

19. The navigation method of claim 15, wherein the sequential capturing is performed by a rolling shutter image sensor and the method further includes processing the pair of images based on a speed of the navigable body to reverse distortion caused by a rolling shutter effect.

* * * * *